United States Patent
Keane et al.

(10) Patent No.: US 10,139,623 B2
(45) Date of Patent: Nov. 27, 2018

(54) VIRTUAL OBJECT ORIENTATION AND VISUALIZATION

(71) Applicant: Microsoft Technology Licensing, LLC, Redmond, WA (US)

(72) Inventors: Brian E. Keane, Bellevue, WA (US); Ben J. Sugden, Woodinville, WA (US); Robert L. Crocco, Jr., Seattle, WA (US); Daniel Deptford, Redmond, WA (US); Tom G. Salter, Seattle, WA (US); Laura K. Massey, Redmond, WA (US); Alex Aben-Athar Kipman, Redmond, WA (US); Peter Tobias Kinnebrew, Seattle, WA (US); Nicholas Ferianc Kamuda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

(21) Appl. No.: 13/921,053

(22) Filed: Jun. 18, 2013

(65) Prior Publication Data

US 2014/0368532 A1 Dec. 18, 2014

(51) Int. Cl.
| G02B 27/01 | (2006.01) |
| G06F 3/01 | (2006.01) |
| G06F 3/0481 | (2013.01) |
| G06T 19/00 | (2011.01) |

(52) U.S. Cl.
CPC ........ *G02B 27/017* (2013.01); *G06F 3/012* (2013.01); *G06F 3/04815* (2013.01); *G06T 19/006* (2013.01)

(58) Field of Classification Search
CPC ........ G06T 19/00; G06T 17/00; G06F 3/0481
USPC ........................................ 345/419
See application file for complete search history.

(56) References Cited

U.S. PATENT DOCUMENTS

| 5,267,042 | A  | 11/1993 | Tsuchiya et al. |
| 6,597,818 | B2 | 7/2003  | Kumar et al. |
| 7,693,702 | B1 | 4/2010  | Kerner et al. |
| 8,108,778 | B2 | 1/2012  | Athsani et al. |
| 8,160,400 | B2 | 4/2012  | Snavely et al. |

(Continued)

FOREIGN PATENT DOCUMENTS

| CN | 102834799 A | 12/2012 |
| JP | 2009129183 A | 6/2009 |

(Continued)

OTHER PUBLICATIONS

International Search Report & Written Opinion dated Sep. 4, 2014, in PCT Application No. PCT/US2014/042647 filed Jun. 17, 2014.

(Continued)

*Primary Examiner* — Barry Drennan
*Assistant Examiner* — Terrell M Robinson
(74) *Attorney, Agent, or Firm* — Arent Fox LLP

(57) ABSTRACT

A method and apparatus for the creation of a perspective-locked virtual object having in world space. The virtual object may be consumed) by another user with a consumption device at a location, position, and orientation which is the same as, or proximate to, the location, position, and orientation where the virtual object is created. Objects may have one, few or many allowable consumption locations, positions, and orientations defined by its creator.

17 Claims, 19 Drawing Sheets

(56) References Cited

U.S. PATENT DOCUMENTS

| | | | |
|---|---|---|---|
| 8,635,021 B2* | 1/2014 | Heng | G01C 21/3682 340/995.27 |
| 2008/0147325 A1 | 6/2008 | Maassel et al. | |
| 2009/0051682 A1* | 2/2009 | Lonsing | G06T 15/00 345/419 |
| 2009/0289955 A1 | 11/2009 | Douris et al. | |
| 2009/0293012 A1* | 11/2009 | Alter et al. | 715/810 |
| 2011/0066375 A1* | 3/2011 | France | G01C 15/00 701/469 |
| 2011/0214082 A1* | 9/2011 | Osterhout | G02B 27/017 715/773 |
| 2011/0275415 A1* | 11/2011 | Lee | G06F 1/1686 455/566 |
| 2012/0113092 A1* | 5/2012 | Bar-Zeev et al. | 345/419 |
| 2012/0113143 A1 | 5/2012 | Adhikari et al. | |
| 2012/0127284 A1* | 5/2012 | Bar-Zeev et al. | 348/53 |
| 2012/0176410 A1* | 7/2012 | Meier | G06F 3/011 345/633 |
| 2012/0249741 A1* | 10/2012 | Maciocci et al. | 348/46 |
| 2012/0249797 A1 | 10/2012 | Haddick et al. | |
| 2012/0290591 A1* | 11/2012 | Flynn | G06F 17/30247 707/754 |
| 2013/0038510 A1 | 2/2013 | Brin et al. | |
| 2013/0044042 A1 | 2/2013 | Olsson et al. | |
| 2013/0044130 A1* | 2/2013 | Geisner | G09G 5/00 345/633 |
| 2013/0083008 A1 | 4/2013 | Geisner et al. | |
| 2013/0083173 A1 | 4/2013 | Geisner et al. | |
| 2013/0141421 A1* | 6/2013 | Mount et al. | 345/419 |

FOREIGN PATENT DOCUMENTS

| | | | |
|---|---|---|---|
| JP | 2012078224 A | 4/2012 | |
| JP | 2012216135 A | 11/2012 | |
| RU | 2233003 C2 | 7/2004 | |

OTHER PUBLICATIONS

Amendment dated Dec. 18, 2014, in PCT Application No. PCT/US2014/042647 filed Jun. 17, 2014.

DiVerdi, et al., "Envisor: Online Environment Map Construction for Mixed Reality" In Proceedings of IEEE Virtual Reality Conference, Mar. 8, 2008, 15 pages.

"International Preliminary Report on Patentability Issued in PCT Application No. PCT/US2014/042647", dated Sep. 28, 2015, 7 Pages.

"Second Written Opinion Issued in PCT Application No. PCT/US2014/042647", dated Jul. 1, 2015, 6 Pages.

"Office Action Issued in European Patent Application No. 14737446.6", dated Feb. 12, 2018, 8 Pages.

"Office Action Issued in Mexican Patent Application No. MX/a/2015/017875", dated Dec. 9, 2018, 5 Pages.

"First Office Action and Search Report Issued in Chinese Patent Application No. 201480035022.X", dated Feb. 8, 2018, 15 Pages.

"Office Action Issued in Japanese Patent Application No. 2016-521497", dated May 1, 2018, 9 Pages.

"Office Action Issued in Russian Patent Application No. 2015154279", dated May 11, 2018, 7 Pages. (W/o English Translation).

"Office Action Issued in European Patent Application No. 14737446.6". dated Jul. 17, 2018, 6 Pages.

"Second Office Action Issued in Chinese Patent Application No. 201480035022.X", dated Sep. 30, 2018, 12 Pages.

* cited by examiner

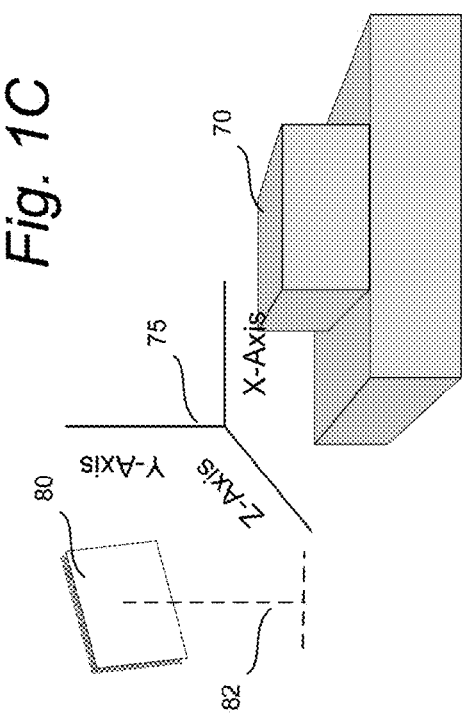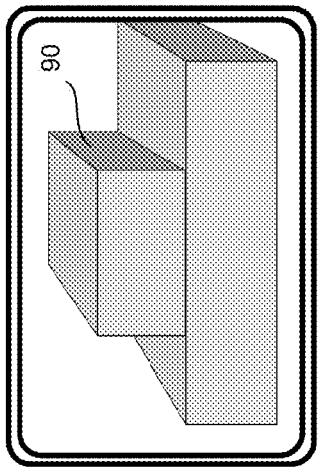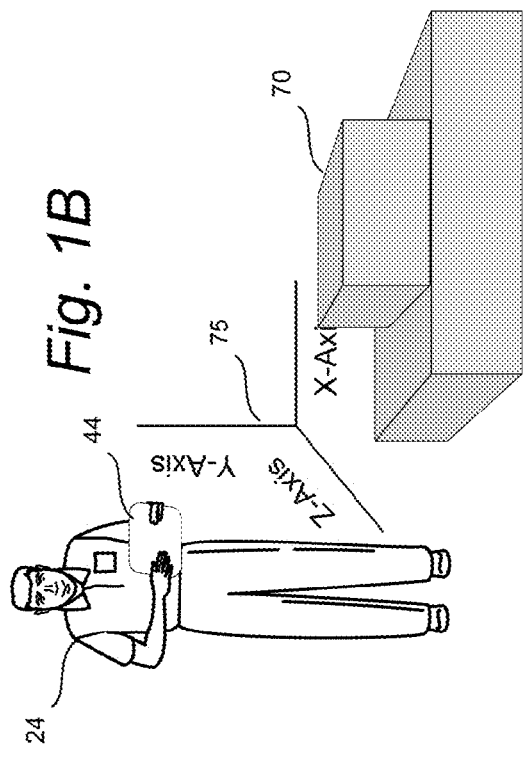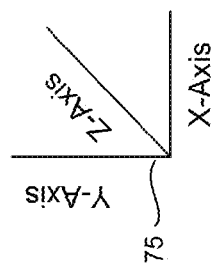

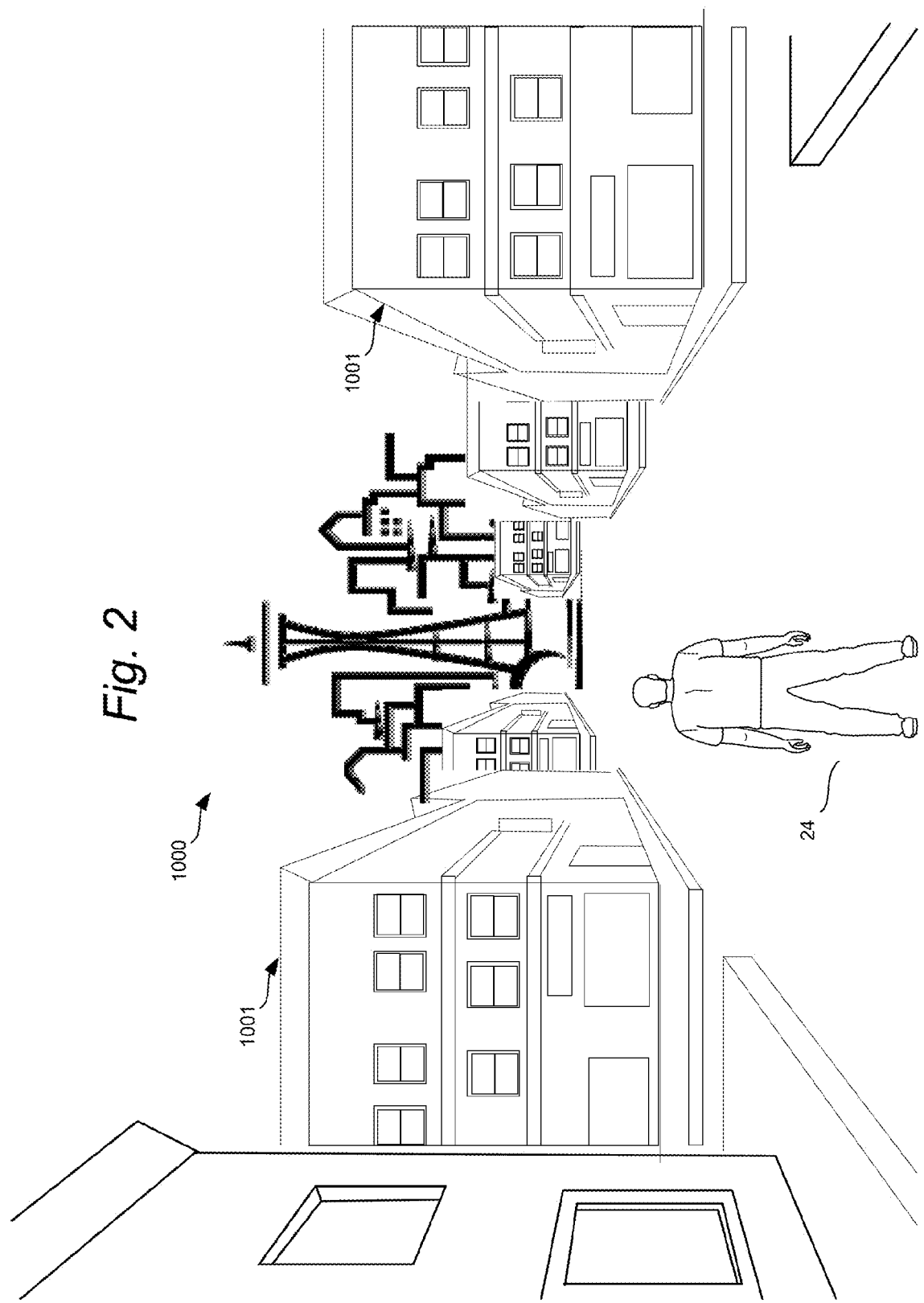

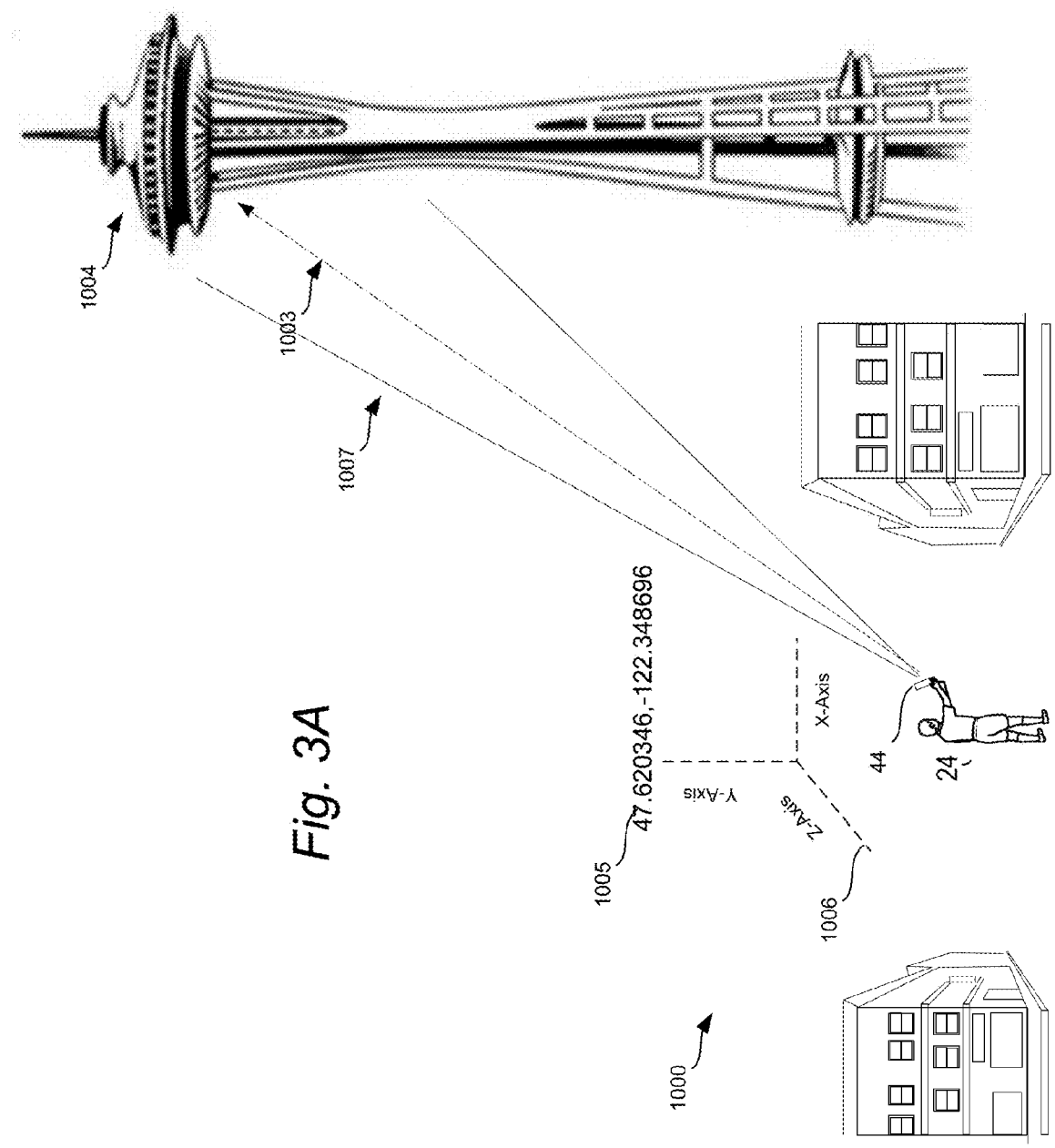

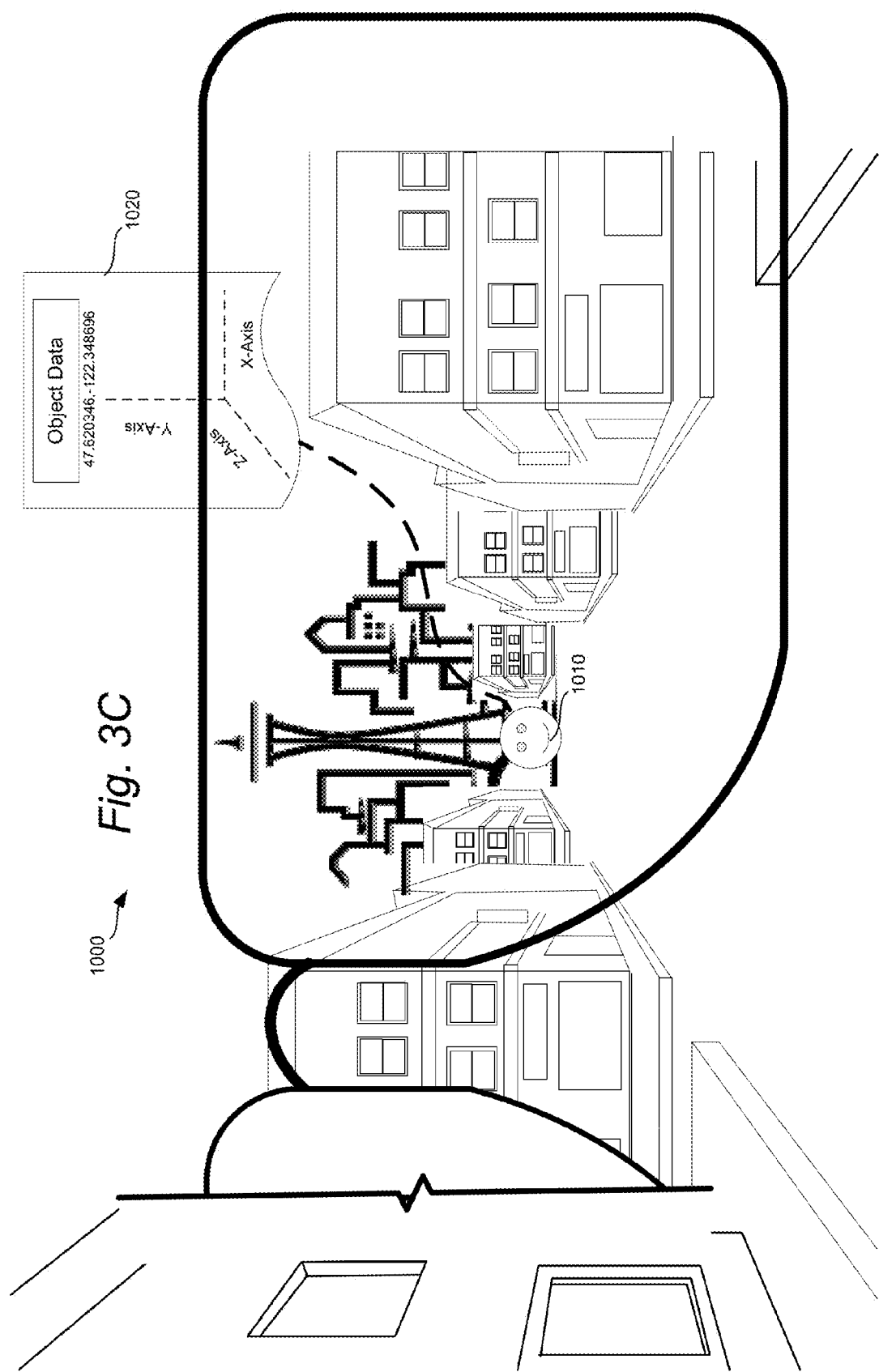

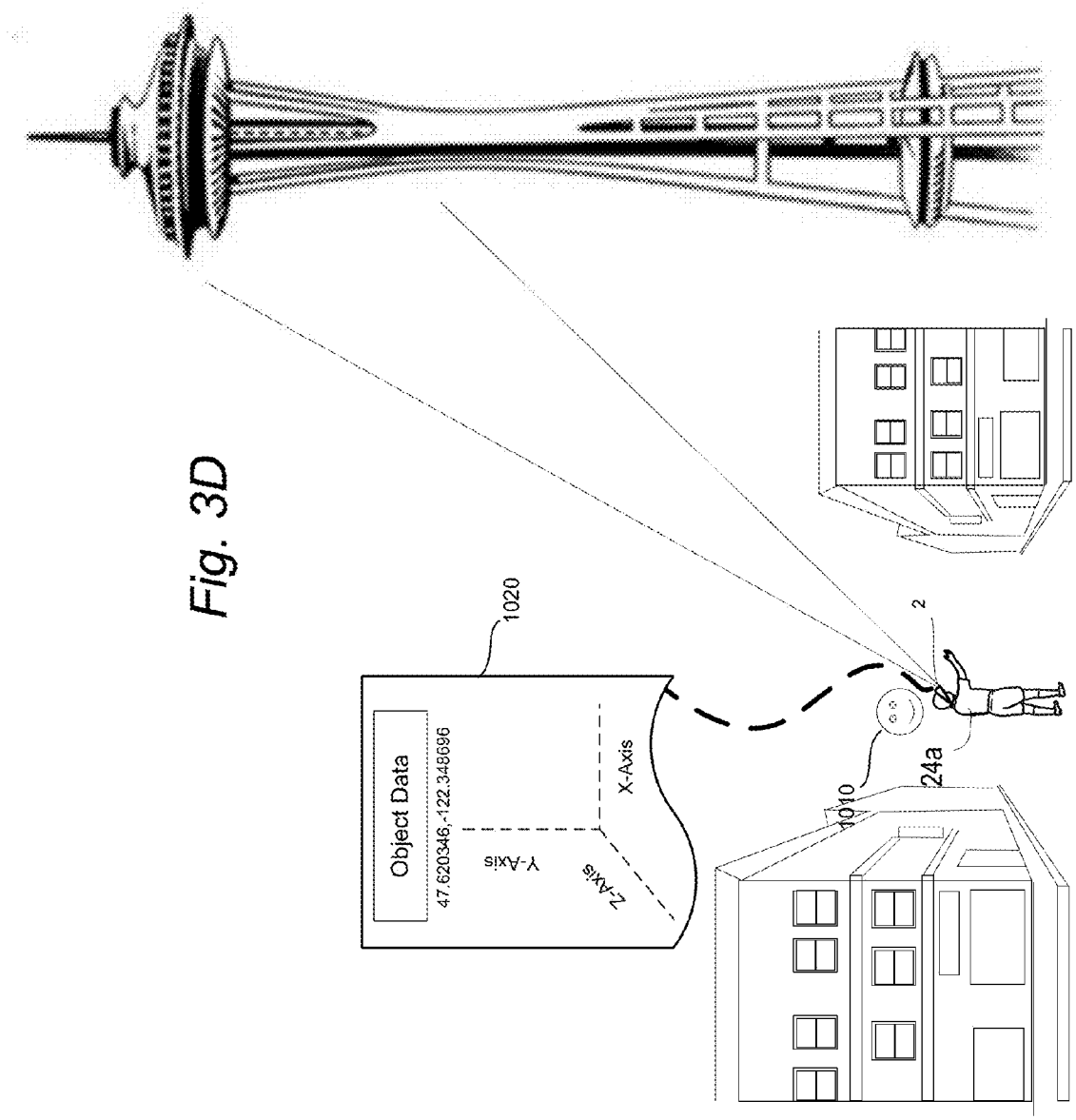

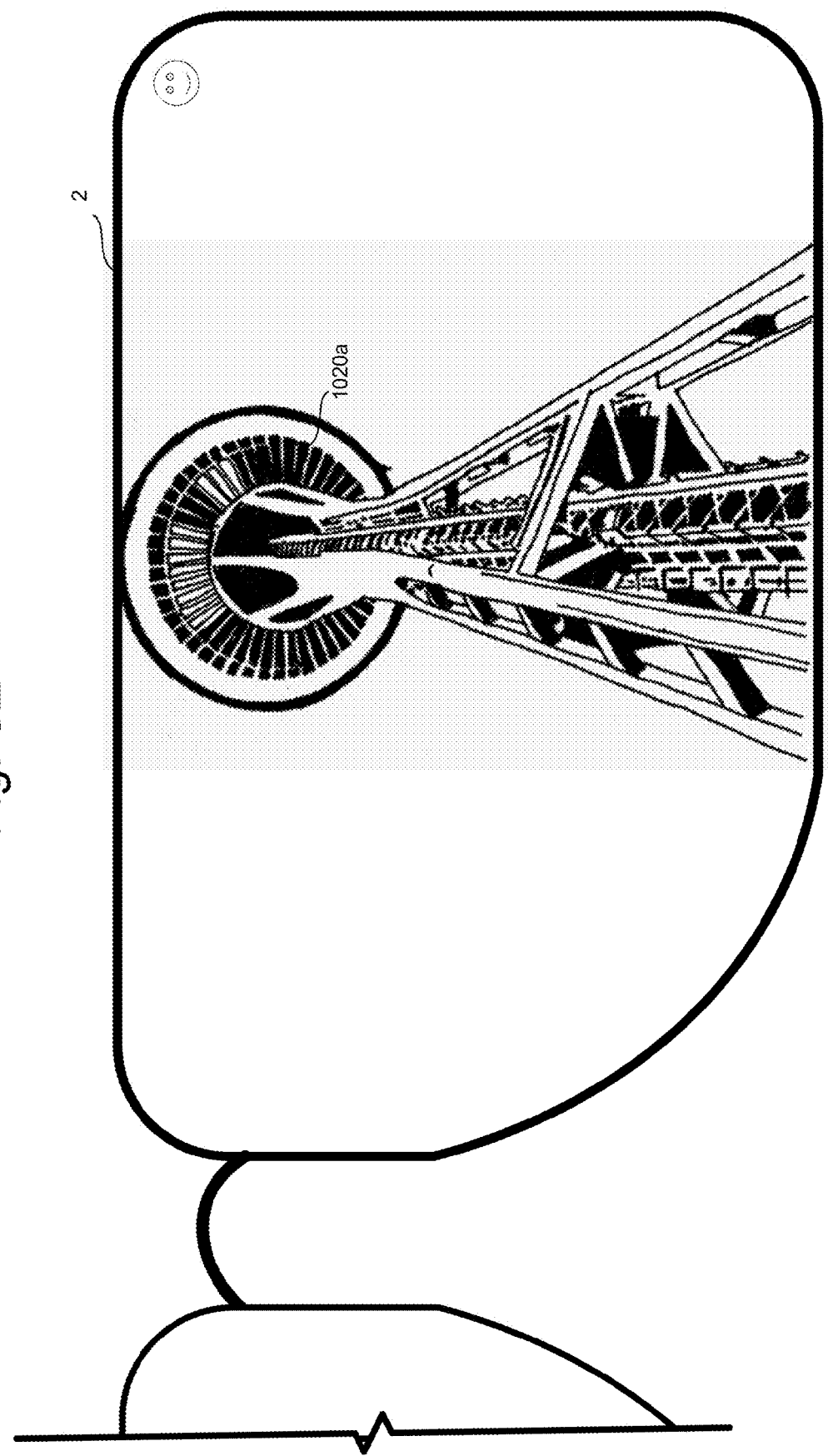

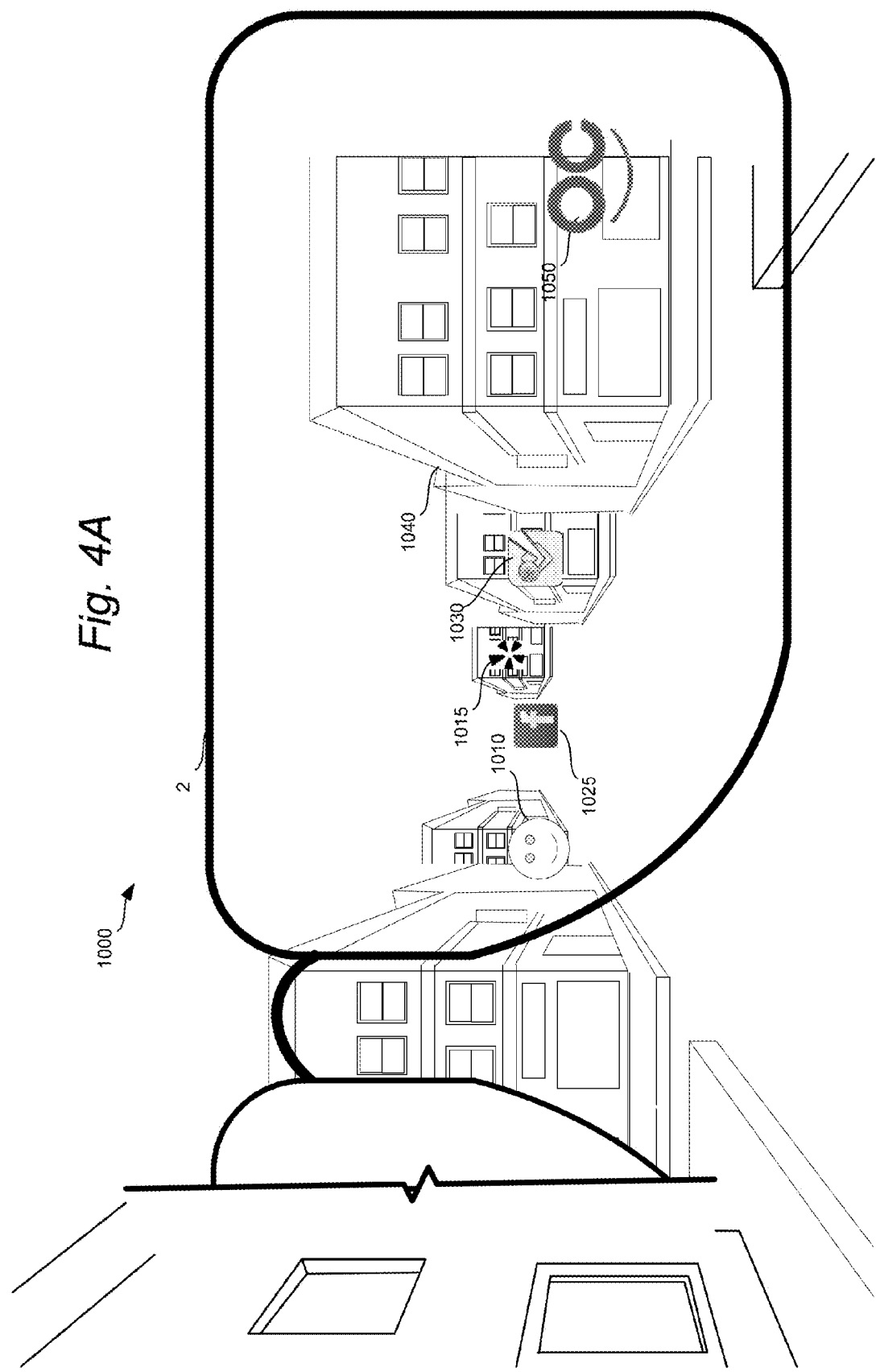

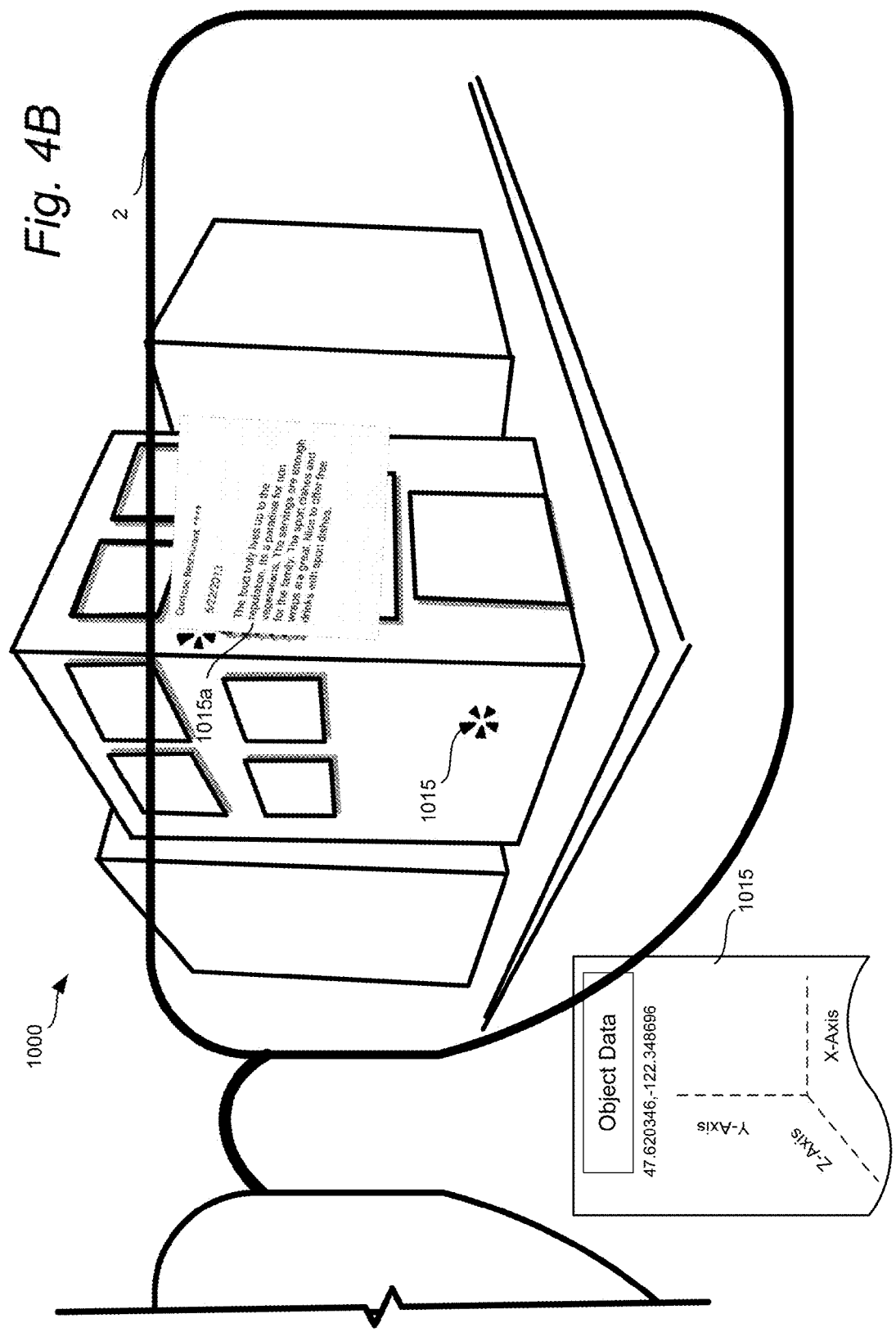

VIRTUAL OBJECT ORIENTATION AND VISUALIZATION

BACKGROUND

One current use of mobile devices is to allow a "virtual" perspective a real-world environment. Currently, some applications which may be used on mobile devices use the camera input from the device and GPS coordinates to render a two-dimensional image on items (usually buildings) in the real world. These objects are generally viewable any position and are usually three-dimensional in appearance, but rendered on a flat display of the mobile device.

Mixed reality is a technology that allows virtual object to be mixed with a real world physical environment. A see-through, head mounted display (HMD) device may be worn by a user to view the mixed imagery of real objects and virtual objects displayed in the user's field of view.

SUMMARY

Technology is presented which allows for the creation of a perspective-locked virtual object. The virtual object may be consumed (viewed, heard or interacted with) by another user with a consumption device at a location, position, and orientation which is the same as, or proximate to, the location, position, and orientation where the virtual object is created. Objects may have one, few or many allowable consumption locations, positions, and orientations defined by its creator In one aspect, an apparatus is provided that can create and/or consume shared perspective-locked virtual objects. The apparatus position, orientation and location are determined. When consuming a shared perspective-locked virtual object, a shared virtual object is received which includes including rendering location data. The shared virtual object is displayed in the consumption device if the field of view of the consumption device is at position and orientation determined match allowable.

When creating a shared perspective-locked virtual object, the global coordinate location, position and orientation of the capture device are determined and shared virtual object rendering data is created. The rendering data includes rendering location data for the shared virtual object. Rendering location data may at least a global coordinate location, and at least one position and at least one orientation for the virtual object with respect to a local coordinate system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1B-1D illustrate a user performing aspects of the method of FIG. 1A.

FIG. 2 is a perspective view of a user viewing a real-world environment.

FIG. 3A is a perspective view of a user using a capture device in a real-world environment.

FIG. 3C is a depiction of the view of the user in FIG. 2 through a see-through head mounted display device.

FIG. 3D illustrates a user at the position associated with a virtual marker.

FIG. 3E is a depiction of the user of a see-through head mounted display device viewing the virtual object captured in FIG. 3B.

FIG. 4A is a second perspective view of a user viewing the scene in FIG. 2 through a see-through head mounted display device.

FIG. 4B is a view of a world-locked virtual object through the view of a see-through head mounted display device.

DETAILED DESCRIPTION

Technology is presented which allows for the creation of a perspective-locked virtual object in world space. The virtual object may be consumed (viewed, heard or interacted with) by another user with a consumption device at a location, position, and orientation which is the same as, or proximate to, the location, position, and orientation where the virtual object is created. Objects may have one, few or many allowable consumption locations, positions, and orientations defined by its creator.

The technology allows users to create and share objects that lock object consumers to one or more perspectives on how the creator wishes the viewer to perceive the object.

Figure 1A:
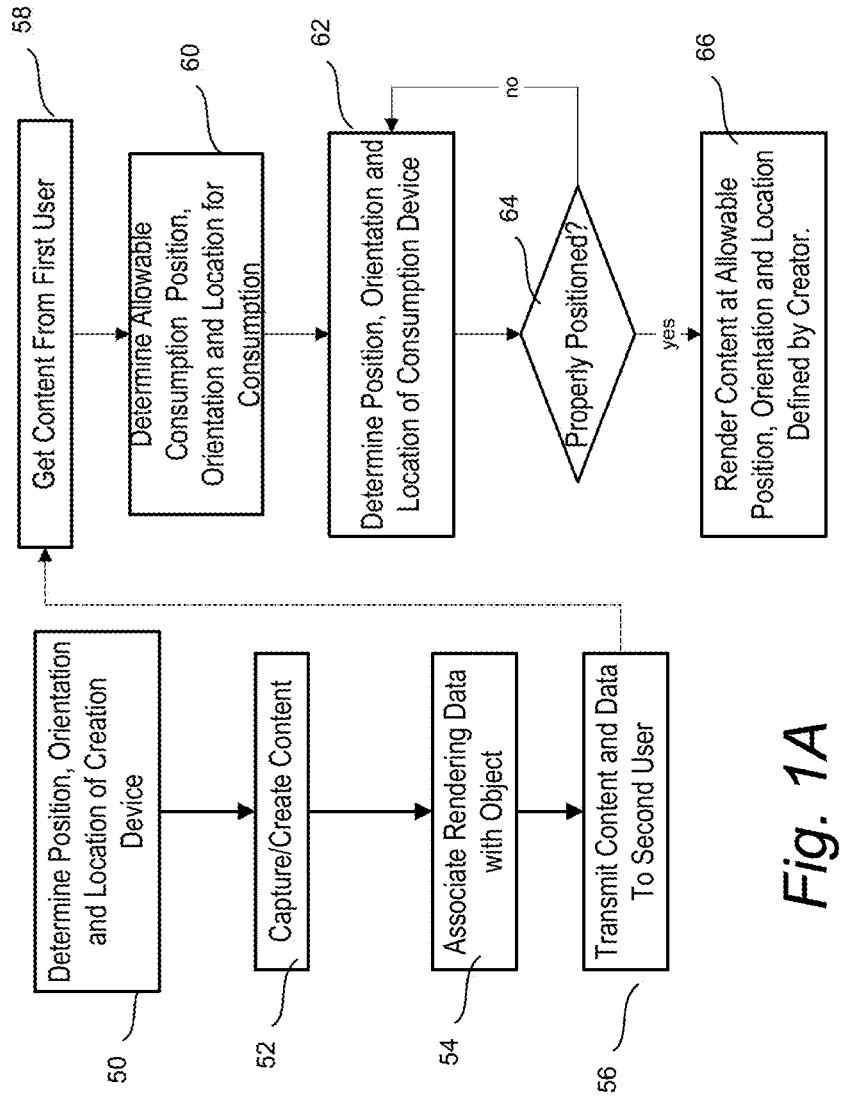
FIG. 1A is a method illustrating a basic implementation of the present technology.

FIG. 1A is a method illustrating a first embodiment of the present technology for capturing and sharing a virtual object with a defined orientation and visualization. FIG. 1A will be described with respect to FIGS. 1B through 1D which illustrate a user creating content. At step 50, the position, orientation and location of a creation device is determined. As will be described herein, the position, orientation, and location can be described relative to a global coordinate system and a local coordinate system. At step 52, content is created and captured by the creation device. The creation device may include a capture device which can receive various types of audio/visual data and user supplied information to be provided in a virtual object. At 52, location, position and orientation data can be used to define the perspective of the capture device. The perspective is used to determine how a shared virtual object should be rendered to a consumer. Creation and capturing of content may include time of capturing the object data.

FIG. 1B illustrates a user 24 having a creation device, in this case a tablet computer, capturing a real world object 70. The user 24 may be located within world space defined by a global coordinate system, and the capture device's orientation and position within the world space defined relative to a local coordinate system 75. FIG. 1C illustrates the perspective 80 of the capture device relative to the real world object 70. The perspective has a height 82 relative to the height at which user held the capture device 44, as well as a three dimensional position and orientation which may be described by orientation coordinates relative to the local coordinate system. In the example in FIGS. 1B-1D, user 24 is creating a virtual object 90, in this case a two-dimensional picture, of the real world object 70. The virtual object 90 is illustrated in FIG. 1D and has a perspective associated with the creation device 44. At step 52, user may also define one or more allowable consumption positions for a consuming device. In one aspect, only one consumption position for a consuming device may be allowed. This would provide the consuming device at the same location position and orientation as the capture device. In other examples, numerous allowable consumption positions may be provided.

While the example shown in FIGS. 1B through 1D illustrate creating a picture, numerous types of virtual objects may be created in accordance with the present technology. These include a two-dimensional and three-dimensional virtual objects which may be rendered in various different types of computing or processing devices.

Returning to FIG. 1A, at step 54, rendering data comprising the captured information for the virtual object is associated with the location, position, and orientation, and stored with an object definition. At step 56, the object definition including rendering data and position information are transmitted to a second user. As will be discussed below, step 56 can include transmitting the data to a central service, or directly to a second user of a consumption device. As will also be discussed below, the consumption device may similarly be any of a number of various types of processing devices, including as discussed below with respect to FIGS. 3z-3e, a see-through head mounted display device.

At step 58, content is retrieved at a consumption device from the first user. At step 60, allowable consumption position, orientation and locations for the shared virtual object are determined. At step 62, position orientation and location of the consumption device is determined. In one embodiment, a consumption device may only render a shared virtual object when the consumption device is in the same position, orientation and location as the capture device. In another embodiment, consumption device may render a shared virtual object when the consumption device is in one or more allowable position, orientation, and locations defined by the creation device. In a third embodiment, the consumption device may render a shared virtual object when the consumption device is in a position proximate to an defined rendering position for the virtual object as defined by the capture device, with the allowable location, position, and orientation for the consuming device defined relative to the rendering position.

If, at step 64, the consumption device is not properly position, then adjustments to the positioning of the consumption device can be made. If the device is properly positioned at 64, the content may be rendered at the position orientation and location defined by the creation device.

The technology has applicability in providing information to users in a large scale environment. FIG. 2 illustrates user 24 viewing real world environment 1000, various building scenery are visible to the user. Virtual objects may comprise views, audiovisual data, or other types of information rendered from the perspective of user 24, or on various real world objects such as buildings 1001 FIG. 2.

FIGS. 3A-3E illustrate user of the technology in a large real world environment. In this aspect, a user can create a shared virtual object, and leave markers in the environment for other users indicating where shared virtual objects exist in the environment. This can allow a second user to approach the marker and consume the virtual object created by the first user.

In one example, suppose a user on vacation takes a picture of a particular scene with user's family standing in front of a landmark building. At a later point in time, a second user may arrive on the scene, and view the virtual object picture of the user's family in front of the landmark in the same position and orientation at which the picture was taken.

FIG. 3A illustrates user 24 with a creation device 44 using the device to create a virtual object from a real world object, in this case the building 1004. As illustrated in FIG. 3A, user has a perspective 1003 relative to the building 1004. As in the example above in FIGS. 1A through 1D, the user's perspective 1003 can be referenced to a world location defined by global coordinates 1005, and a local coordinate system 1006. The field of view of the capture device is illustrated at 1007.

Figure 3B:
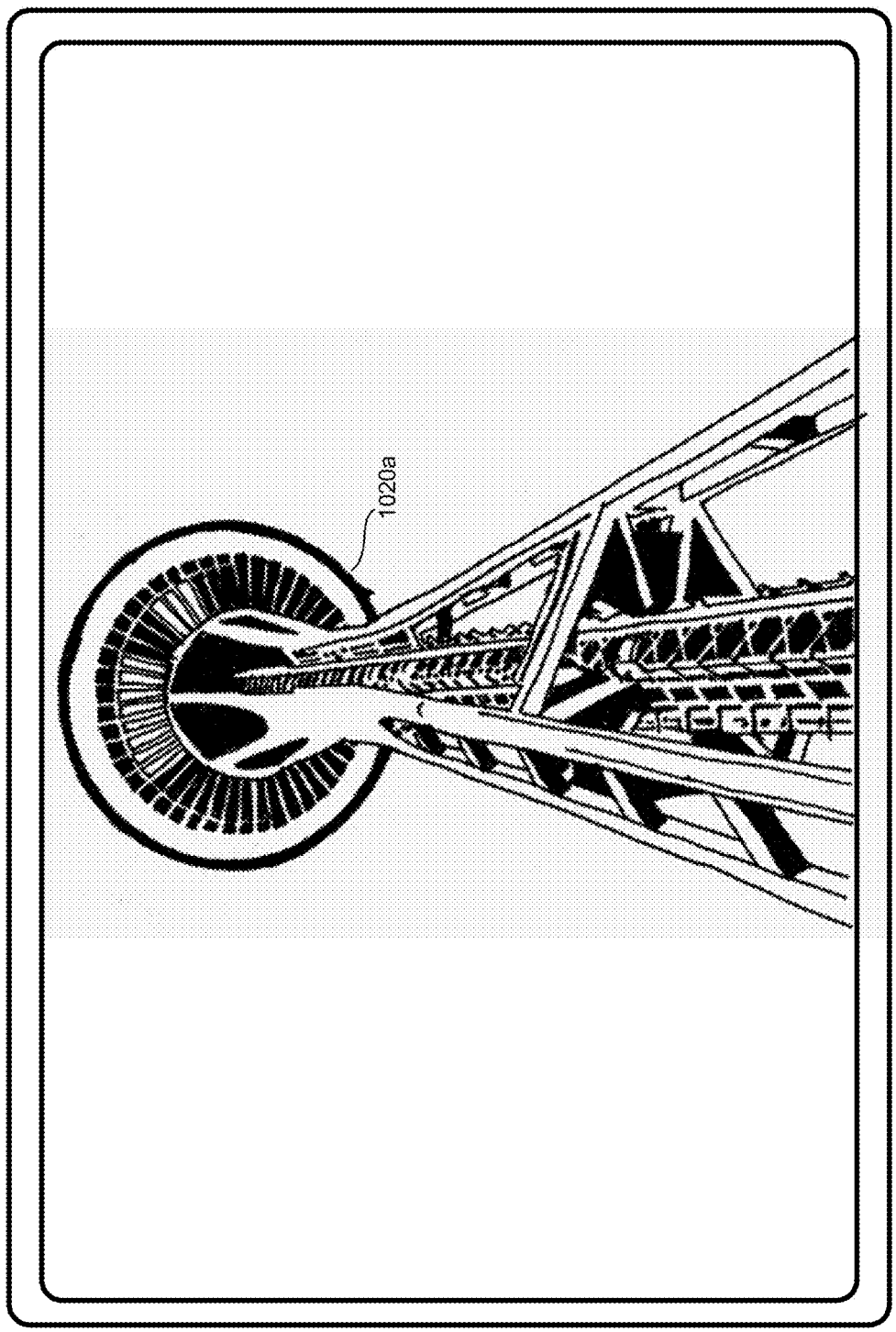
FIG. 3B is a depiction of a virtual object, in this case an image, on the capture device of the user in FIG. 2.

The field of view at perspective 1003 of user's capture device 44 is illustrated FIG. 3B. In FIG. 3B, a virtual object 1020a comprising a picture of building 1004 has been created. It should be understood that the local coordinate system 1006 may be related to the global coordinate system using one or more positional relationships allowing orientation of the local coordinate system relative to locations defined by the global coordinate system.

FIG. 3C illustrates the perspective view of a user 24 wearing a see-through head mounted display device in the environment 1000 of FIG. 2. As will be described below, a see through head mounted display device is a mixed reality device which allows a user to see virtual objects rendered in an environment. In FIG. 3C, a marker 1010 associated with a virtual object definition 1020 appears to the wearer of a see-through head mounted display device 2. (It should be understood that the object definition 1020 illustrated in FIG. 3C and those referenced hereafter is not visible to the user, except in rendered form as a virtual object.) In accordance with the technology, when the user positions themselves the location associated with the marker 1010, user can view or consume the virtual object created by user 24.

FIG. 3D illustrates user 24A at the position associated with marker 1010. User 24A is wearing a see-through head mounted display device 2 and positions himself at the same location, orientation, and position relative to the creation device of the user 24 in FIG. 3A. Object definition 1020 includes rendering information as well as global coordinates and local coordinates defining an allowable rendering position to the see-through head mounted display 2.

As shown in FIG. 3e, the see through head mounted display will render the virtual object 1020a wherein the allowable rendering position, the rendering position in this example having the same location, position, and orientation as the original creation device. As shown in FIG. 3E, the perspective of user 24A and the view of the object 1020a created in FIG. 3A is the same as that of user 24 who created virtual object 1020a.

FIGS. 4A and 4B illustrate another aspect of the present technology including the user of third party sourced information in creating and rendering virtual object. FIG. 4A is a perspective view of a user wearing a see-through head mounted display device 2 in an environment 1000 where a plurality of markers have been provided. In the example shown in FIG. 4A, marker 1010 is illustrated. Marker 1010 may be a marker provided by a user and shared directly with another user. Also illustrated in FIG. 4A are third-party data markers 1015, 1025, 1030, 1040, 1050. Third party data markers are associated with virtual objects whose information may be derived from third-party services. As will be described below, a central service may gather information from any of a number of third-party services, and create virtual objects at positions defined by the central service and/or defined by the information provided by the third-party service. In another alternative, third-party services themselves may define virtual objects for use in an environment. For example, the proprietor of a restaurant may define a virtual object for display in the environment and define an associated marker for use in the environment. This target and associated virtual object may be provided to essential service for display to users of consumption devices.

FIG. 4B illustrates the perspective view of a virtual object 1015a associated with marker 1015 in FIG. 4B. FIG. 4B also illustrates an example of a "world locked" object with multiple allowable viewing locations, positions, and orientations. Virtual object 1015a is shown as positioned on the side of the building and includes information provided by third party service Yelp®. In this instance, virtual object 1015a is a "world locked" virtual object whose position is associated with a physical object (the building) and may have a number of allowable rendering locations, orientation, and positions relative to the position of the consumption device. For example, as a user moves in FIG. 4B relative to the building and virtual object 1015a, virtual object 1015a will still appear on the side of the building. Hence, a number of allowable positions are available to view the virtual object 1050a.

In the example shown in FIG. 4B, a see through head mounted display device 2 is considered to be proximate to the rendering location of the world locked object 1015 a. Locations proximate to the rendering location would include all allowable locations, positions, and orientations defined in the perspective-locked virtual object at which rendering by consumption device can occur.

As noted above, the consumption device and the creation device may comprise any of a number of suitable processing devices as described herein. The technology finds particular applicability when used with a see-through head mounted display device capable of rendering objects in a mixed reality environment.

When a see through head mounted display device is used as the creation device, various different types of virtual objects may be created. In one aspect, the virtual object may include a combination of all the sensory inputs available from see through head mounted display device which are rendered back to a consuming user assuming that the consuming device is capable rendering all the inputs. For example, a creating user may record a walk-through a particular environment, which is played back to a consuming user as the user makes the same walk through the environment. All aspects of the creation event, including for example video sights, audio sounds, and the like, but be played back to the consuming user.

A head mounted display device includes a display element and a processing unit. The display element is to a degree transparent so that a user can look through the display element at real-world objects within the user's field of view (FOV). The display element also provides the ability to project virtual images into the FOV of the user such that the virtual images may also appear alongside and mixed with the real-world objects. The system automatically tracks where the user is looking so that the system can determine where to insert the virtual image(s) in the FOV of the user. Once the system knows where to project the virtual image, the image is projected using the display element.

In embodiments, the head mounted display device including its processing unit may build a model of the mixed reality environment including the x, y, z, pitch, yaw and roll positions of users, real-world objects and virtual three-dimensional objects in the environment. The positions of each head mounted display device worn by the users in the environment may be calibrated to the model of the environment and to each other. This allows the system to determine each user's line of sight and FOV of the environment. Thus, a virtual image may be displayed to each user, but the system determines the display of the virtual image from each user's perspective, adjusting the virtual image for parallax and any occlusions from or by other objects in the environment.

A user may choose to interact with one or more of the virtual objects appearing within the user's FOV. As used herein, the term "interact" encompasses both physical interaction and verbal interaction of a user with a virtual object. Physical interaction includes a user performing a predefined gesture using his or her fingers, hand and/or other body part(s) recognized by the mixed reality system as a user-request for the system to perform a predefined action. Such predefined gestures may include, but are not limited to, pointing at, grabbing, pushing and positioning virtual objects.

A user may also physically interact with a virtual object with his or her eyes. In some instances, eye gaze data identifies where a user is focusing in the FOV, and can thus identify that a user is looking at a particular virtual object or real world object. Sustained eye gaze, or a blink or blink sequence, may thus be a physical interaction whereby a user selects one or more virtual objects. A user simply looking at a virtual object, such as viewing content on a virtual display slate, is a further example of physical interaction of a user with a virtual object.

A user may alternatively or additionally interact with virtual objects using verbal gestures, such as for example a spoken word or phrase recognized by the mixed reality system as a user request for the system to perform a predefined action. Verbal gestures may be used in conjunction with physical gestures to interact with one or more virtual objects in the mixed reality environment.

FIGS. 5-8 illustrate a see through head mounted display device 2, which in one embodiment is in the shape of glasses, worn on the head of a user so that the user can see through a display and thereby have an actual direct view of the space in front of the user. The use of the term "actual direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

A processing unit 4 may include much of the computing power used to operate head mounted display device 2. In embodiments, the processing unit 4 communicates wirelessly (e.g., WiFi, Bluetooth, infrared, or other wireless communication means) to one or more central services 900.

A head mounted display device may include a display element. The display element is to a degree transparent so that a user can look through the display element at real world objects within the user's field of view (FOV). The display element also provides the ability to project virtual objects into the FOV of the user such that the virtual objects may also appear alongside the real world objects. The system automatically tracks where the user is looking so that the system can determine where to insert the virtual object in the FOV of the user. Once the system knows where to project the virtual object, the image is projected using the display element.

Virtual objects may include an object definition such as definition 1020 discussed above. The definition may include data allowing the display device 2 to render the virtual object in the field of view of a user. One component of the definition may comprise an object type, object size, and one or more optimal viewing perspectives and orientation. Each optimal viewing perspective may comprise a definition of an optimal perspective for a user view of the object. When a virtual object is shared, the technology presented herein uses the object definition and the locations and field of view of each user with whom the object is shared to determine an optimal location at which to render the object for each user.

In one alternative, other computing systems and one or more of the processing units may cooperate to build a model of the environment including the x, y, z Cartesian positions of all users, real world objects and virtual three-dimensional objects in the room or other environment. The positions of each head mounted display device worn by the users in the environment may be calibrated to the model of the environment and to each other. This allows the system to determine each user's line of sight and FOV of the environment. Thus, a virtual object may be displayed to each user, but the display of the virtual object from each user's perspective may be relative, adjusting the virtual object for parallax and any occlusions from or by other objects in the environment. The model of the environment, referred to herein as a scene map, as well as all tracking of the user's FOV and objects in the environment may be generated by computing systems and mobile processing unit working in tandem or individually.

Figure 5:
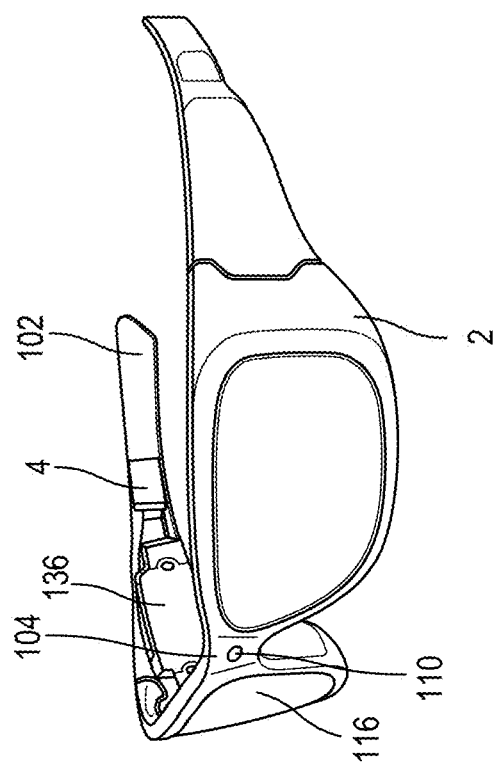
FIG. 5 is a perspective view of one embodiment of a head mounted display unit.
Figure 6:
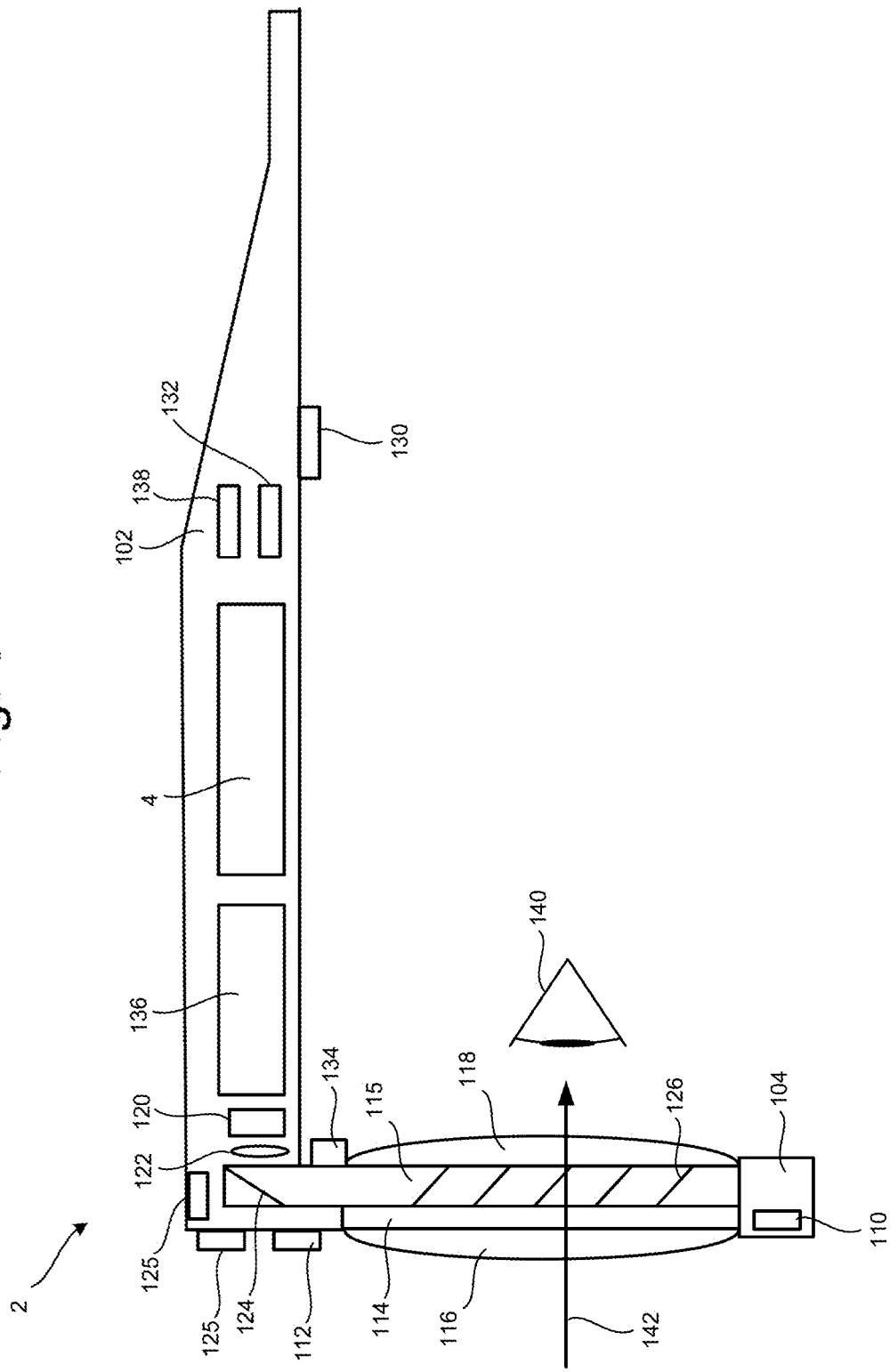
FIG. 6 is a side view of a portion of one embodiment of a head mounted display unit.

FIGS. 5 and 6 show perspective and side views of the head mounted display device 2. FIG. 6 shows the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). Light-guide optical element 115 channels artificial light to the eye. More details of opacity filter 114 and light-guide optical element 115 are provided in U.S. Published Patent Application No. 2012/0127284, entitled, "Head-Mounted Display Device Which Provides Surround Video," which application published on May 24, 2012.

Control circuits 136 provide various electronics that support the other components of head mounted display device 2. More details of control circuits 136 are provided below with respect to FIG. 7. Inside or mounted to temple 102 are ear phones 130, inertial measurement unit 132 and temperature sensor 138. In one embodiment shown in FIG. 7, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual object from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that one of the five surfaces is labeled 126 to prevent over-crowding of the drawing. Reflecting surfaces 126 couple the light waves incident upon those reflecting surfaces out of the substrate into the eye 140 of the user. More details of a light-guide optical element can be found in United States Patent Publication No. 2008/0285140, entitled "Substrate-Guided Optical Devices," published on Nov. 20, 2008.

Figure 7:
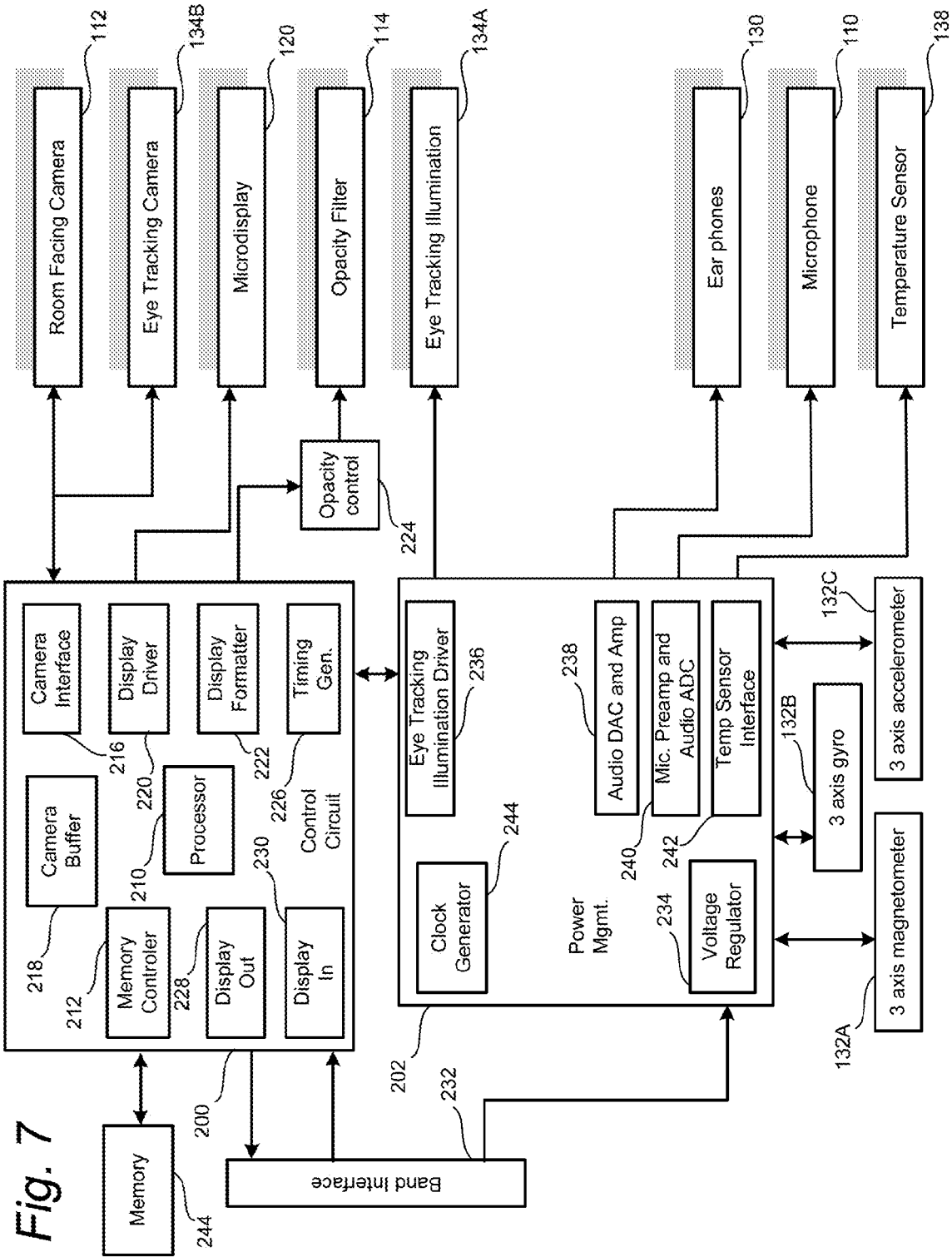
FIG. 7 is a block diagram of one embodiment of the components of a head mounted display unit.

Head mounted display device 2 also includes a system for tracking the position of the user's eyes. As will be explained below, the system will track the user's position and orientation so that the system can determine the FOV of the user. However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 2 includes eye tracking assembly 134 (FIG. 6), which has an eye tracking illumination device 134A and eye tracking camera 134B (FIG. 7). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 6 shows one assembly with one IR transmitter, the structure of FIG. 6 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 6 shows half of the head mounted display device 2. A full head mounted display device would include another set of see-through lenses, another opacity filter, another light-guide optical element, another microdisplay 120, another lens 122, room-facing camera, eye tracking assembly, micro display, earphones, and temperature sensor.

Figure 8:
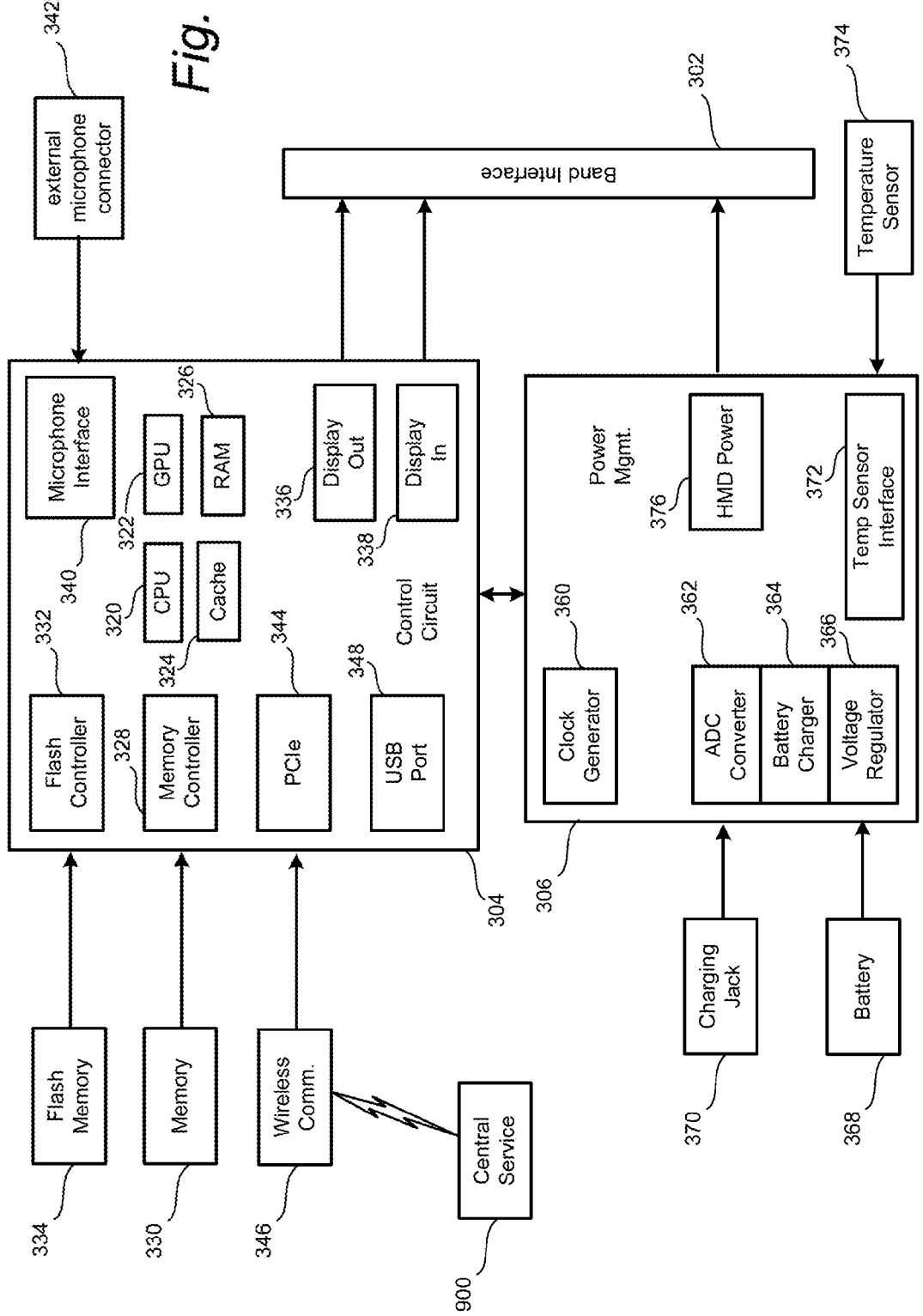
FIG. 8 is a block diagram of one embodiment of the components of a processing unit associated with a head mounted display unit.

FIG. 7 is a block diagram depicting the various components of head mounted display device 2. FIG. 8 is a block diagram describing the various components of processing unit 4. Head mounted display device 2, the components of which are depicted in FIG. 7, is used to provide a mixed reality experience to the user by fusing one or more virtual objects seamlessly with the user's view of the real world. Additionally, the head mounted display device components of FIG. 7 include many sensors that track various conditions. Head mounted display device 2 will receive instructions about the virtual object from processing unit 4 and will provide the sensor information back to processing unit 4. Processing unit 4, the components of which are depicted in FIG. 7, will receive the sensory information from head mounted display device 2 and will exchange information and data with the central service 900 (FIG. 1A). Based on that exchange of information and data, processing unit 4 will determine where and when to provide a virtual object to the user and send instructions accordingly to the head mounted display device of FIG. 4.

Some of the components of FIG. 7 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, all of the components of control circuit 200 are in communication with each other via dedicated lines or one or more buses. In another embodiment, each of the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual object being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual object to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 8 is a block diagram describing the various components of processing unit 4. FIG. 8 shows control circuit 304 in communication with power management circuit 306.

Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to a computing system in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 9:
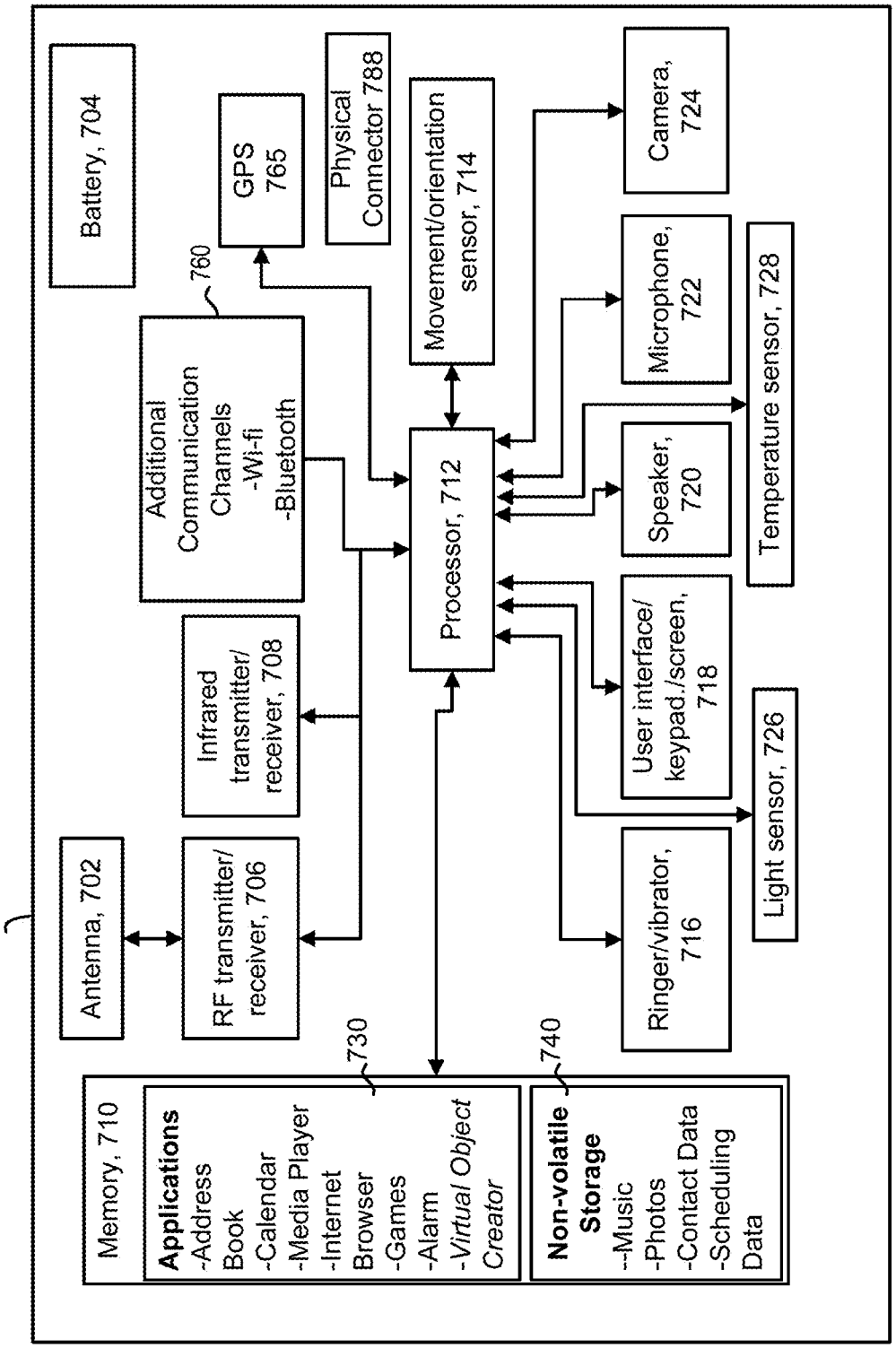
FIG. 9 is a block diagram of one embodiment of a mobile or tablet computing device.

As noted above, various types of processing devices may be utilized with the present technology. FIG. 9 is a block diagram illustrating a mobile or tablet computing device. FIG. 9 is a block diagram of an exemplary mobile or tablet device which may operate in embodiments of the technology described herein (e.g. device 44). Exemplary electronic circuitry of a typical mobile device is depicted. The device 700 includes one or more microprocessors 712, and memory 710 (e.g., non-volatile memory such as ROM and volatile memory such as RAM) which stores processor-readable code which is executed by one or more processors of the control processor 712 to implement the functionality described herein.

Mobile device 700 may include, for example, processors 712, memory 710 including applications and non-volatile storage. The processor 712 can implement communications, as well as any number of applications, including the interaction applications discussed herein. Memory 710 can be any variety of memory storage media types, including non-volatile and volatile memory. A device operating system handles the different operations of the mobile device 700 and may contain user interfaces for operations, such as placing and receiving phone calls, text messaging, checking voicemail, and the like. The applications 730 can be any assortment of programs, such as a camera application for photos and/or videos, an address book, a calendar application, a media player, an Internet browser, games, other multimedia applications, an alarm application, other third party applications, a content creation application discussed herein, and the like. The non-volatile storage component 740 in memory 710 contains data such as web caches, music, photos, contact data, scheduling data, and other files.

The processor 712 also communicates with RF transmit/receive circuitry 706 which in turn is coupled to an antenna 702, with an infrared transmitted/receiver 708, with any additional communication channels 760 like Wi-Fi or Bluetooth, and with a movement/orientation sensor 714 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 712 further communicates with a ringer/vibrator 716, a user interface keypad/screen, biometric sensor system 718, a speaker 720, a microphone 722, a camera 724, a light sensor 726 and a temperature sensor 728.

The processor 712 controls transmission and reception of wireless signals. During a transmission mode, the processor 712 provides a voice signal from microphone 722, or other data signal, to the RF transmit/receive circuitry 706. The transmit/receive circuitry 706 transmits the signal to a remote station (e.g., a fixed station, operator, other cellular phones, etc.) for communication through the antenna 702. The ringer/vibrator 716 is used to signal an incoming call, text message, calendar reminder, alarm clock reminder, or other notification to the user. During a receiving mode, the transmit/receive circuitry 706 receives a voice or other data signal from a remote station through the antenna 702. A received voice signal is provided to the speaker 720 while other received data signals are also processed appropriately.

Additionally, a physical connector 788 can be used to connect the mobile device 700 to an external power source, such as an AC adapter or powered docking station. The physical connector 788 can also be used as a data connection to a computing device. The data connection allows for operations such as synchronizing mobile device data with the computing data on another device.

A GPS transceiver 765 utilizing satellite-based radio navigation to relay the position of the user applications is enabled for such service.

The example processing systems illustrated in the figures include examples of computer readable storage media. Computer readable storage media are also processor readable storage media. Such media may include volatile and non-volatile, removable and non-removable media implemented for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, and the like.

Figure 10:
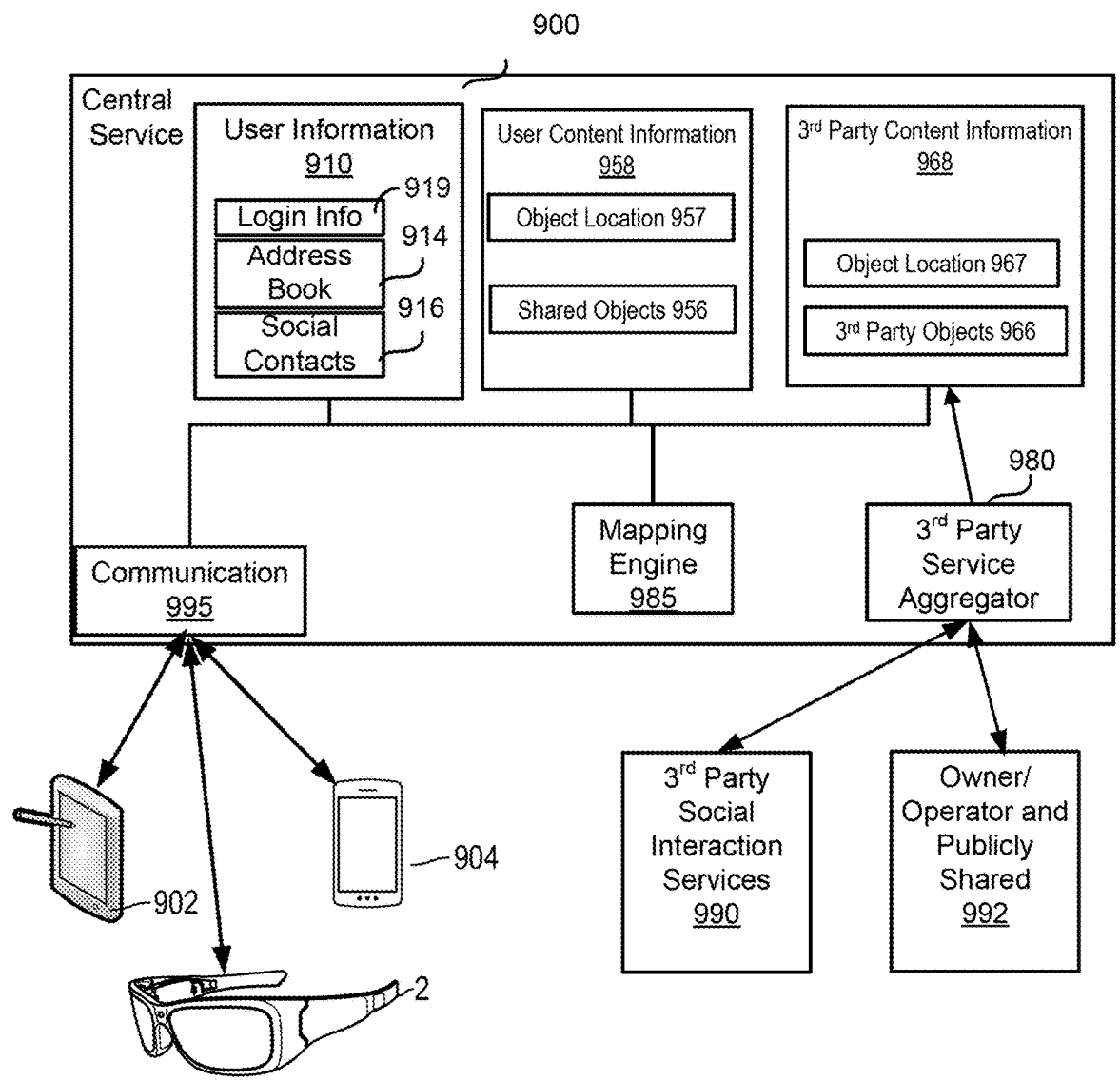
FIG. 10 is a block diagram of a system for implementing a central service in accordance with the present technology.

As noted above, information created and shared for a perspective-locked virtual object having in world space may be utilized with a central service 900. In one aspect the central service is illustrated in FIG. 10. Central service 900 may be operated on one or more processing devices or servers. The logical components of the central service 900 are illustrated in FIG. 10.

Central service 900 may include user information 910, user content information 958, third party contention information 968, a third-party service aggregator 980, a mapping engine 985, and communications interface 995. Communications interface 995 may include any number of interfaces, transport layers and protocols allowing central service 900 to communicate with see-through mounted display device 2, a tablet 902 and mobile phone 904.

User information 910 can include login information 919 requiring user of a device 2, tabled 902, phone 904 and central service 900 to authenticate their identity before accessing secure information available to users of central service 900. Each user may have available via the service 900 the user's address book 914 and social contact data 916, as well as the user's location history 918. In alternative embodiments, all or portions of the user information may be stored locally on the devices.

User content information 958 includes content location information 957 and user-created shared perspective-locked objects 956. User content information may be information on shared virtual objects created by users, such as user 24 above, greeted by the user for sharing with other users of the central service 900. Object location information 957 can include, for a given area, a three-dimensional map the location as well as the locations of objects in the area, and markers to be utilized with the objects. Shared objects 956 can include the specific object data associated with the information in the object location information 957.

Third-party content information 968 also includes object location information 967 and third party perspective-locked objects 966. Third party objects include content information available from third-party social interaction services 990 which is retrieved from the social interaction services 990 through a third-party service aggregator 980. Third party objects 966 can be created by third-party social interaction services 990, or created by the central service using mapping engine 985 and information available from third-party social interaction services. This information may include the allowable rendering locations, discussed above, as well as any information from users of the third party social interaction services.

Third-party service aggregator 980 retrieves information from third-party social media services 990, each of which may provide information that can be used to populate virtual objects. Third-party service aggregator 980 interacts with the application programming interface (API) of each of the third-party interaction services 990.

Mapping engine 985 associates global coordinate location information with location data from users and from third-party service aggregator 980. Mapping engine 985 also receives location information from user devices and updates the user location history 918. The mapping engine may also provide 3D scene data to the see-through head mounted display device 2, tablet 902 and phone 904. This information can be updated as the user location tracking information is provided from the device 2 to the central service 900. The mapping engine 985 can further associate the type of marker to be generated with the third-party information services provider.

Third-party social interaction services 990 may include with their information the global coordinates for points of interest for which they provide information. Many social media services 990 include, along with their reviews, such global coordinate location information. The mapping engine 985 may verify this information, or add global coordinate information to user generated data. This location can be derived from the user's location history, as well as input at the time the user is creates information on a particular point of interest.

Third-party service aggregator 980 may also receive object definitions from owner/operator and publicly shared objects sources by 19. He's objects may be provided by owners and operators of facilities which to have a point object associated with their particular establishment.

Shared objects 956 and third party object 966 includes object rendering data information as well as one or more allowable consumption locations, one or more allowable consumption positions, and one or more allowable consumption orientations for a consumption device seeking to render the object. Central service 900 may be operated by one or more system administrators provide a central service two wearers of the see-through head mounted display device two.

Figure 11:
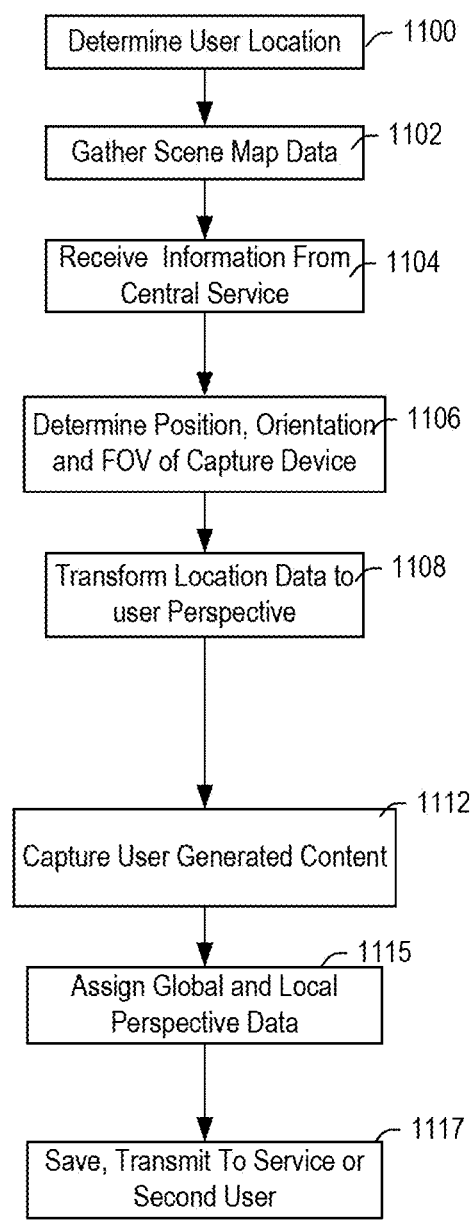
FIG. 11 is a flowchart depicting creation of content by a user or $3^{rd}$ party.

FIG. 11 is a flowchart illustrating a method of creating a sharable perspective-locked virtual object in accordance with the present technology. The method of FIG. 11 may be performed by components of the processing unit 4 and/or head mounted display device 2. Any one or more of the processing unit 4 and/or head mounted display device 2 acting alone or in conjunction with another of the systems may perform all or portions of the method.

With reference to FIG. 11, at step 1100, a user location for a user seeking to create scene data is determined. The user location may be derived from a GPS transmitted in the user device and provide global location coordinates describing the position of the user.

At step 1102, a scene map may be developed identifying the three dimensional geometry of the scene as well as the geometry and positions of objects within the scene around where the user is located. In embodiments, the scene map generated in a given frame may include the x, y and z positions in the local coordinate system of all users, real world objects and virtual objects in the common environment. The scene map may be used in positioning virtual objects within the scene, as well as displaying virtual three-dimensional objects with the proper occlusion (a virtual three-dimensional object may be occluded, or a virtual three-dimensional object may occlude, a real world object or another virtual three-dimensional object). See mapping be derived from capture devices associated with the user, or may be provided by the central service 900.

At step 1104, information from the central service is received. In one embodiment, step 1104 need not be performed. Information received at step 1104 may include templates and virtual object definitions to create perspective-locked objects. Information on virtual objects may be cached in the processing device or the head mounted display 2 to allow the perspective-locked objects to be more rapidly created.

In step 1106, a determination of position, the orientation and the FOV of a user's capture device is made.

In step 1108, location, orientation, position and field of view data is transformed into a user perspective. User perspective may utilized to determine the allowable rendering positions for certain types of shared virtual objects.

In step 1112, user generated content for perspective-locked virtual objects is captured. In accordance with the technology, user generated content may be any type of content which can be captured by the sensor devices discussed above with respect to the different types of computing systems. This includes audio data, visual data, motion data, and text. The user generated content is utilized to build the perspective-locked virtual object which will be rendered. At 1115, the position, orientation, and location information is associated with the user generated content. In addition, where the object is defined as a world-locked object, displayable from a number of different perspectives, and allowable consumption positions, locations and orientations may be defined.

In the example shown in FIGS. 1A-1D, a single perspective may be defined based on a location, orientation, and position. In the example shown in FIG. 4B, numerous perspectives may be defined and hence numerous different allowable consumption locations are available for the world-locked virtual object.

At 1117, the virtual object is shared with a second user or transmitted to the central service 900.

Figure 12:
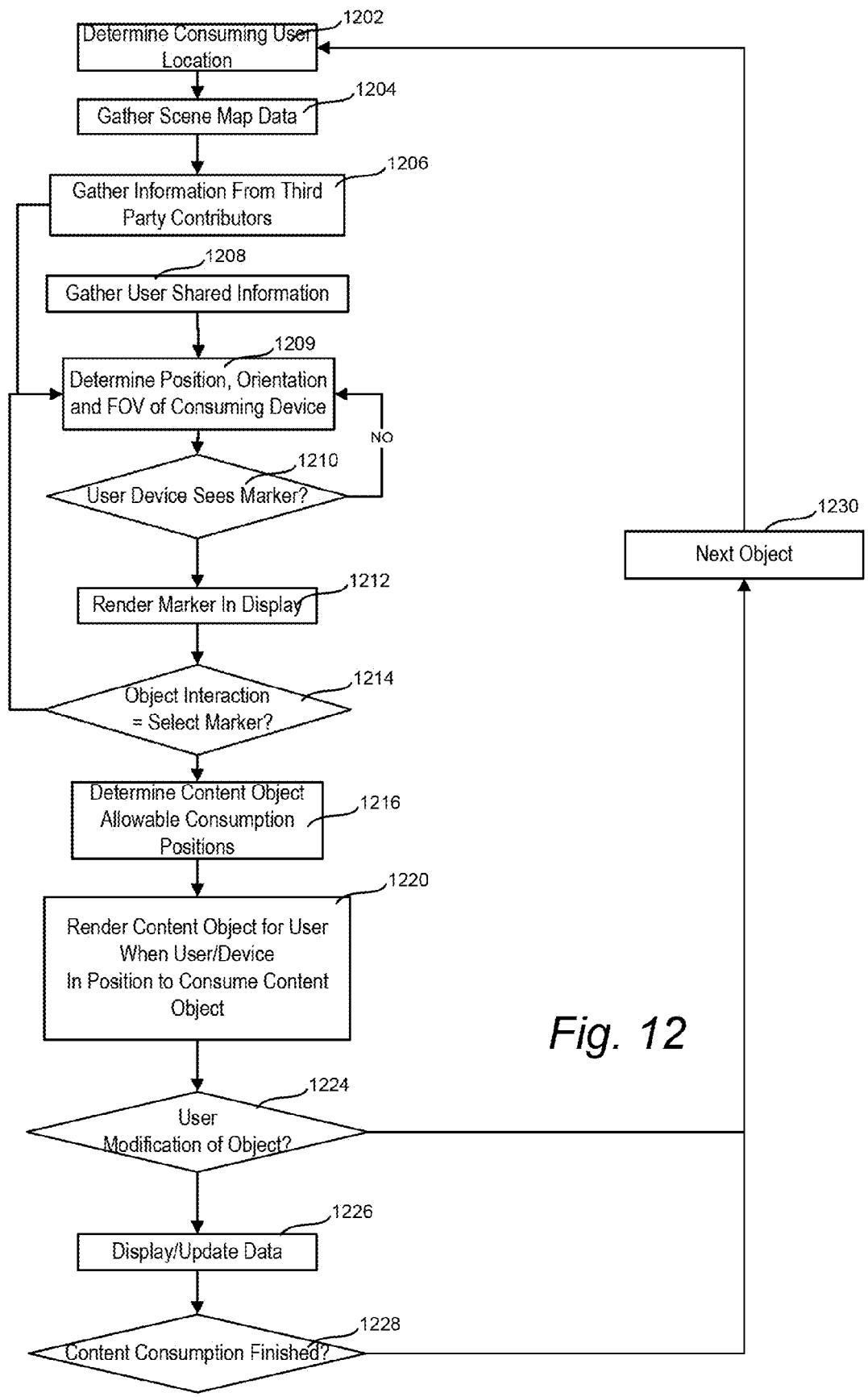
FIG. 12 is a flowchart illustrating display of created content by a user in accordance with the present technology.

FIG. 12 illustrates a method performed by the device of a consuming user (a consuming device) wishing to view a virtual object in accordance with the present technology.

At step 1202, the consuming user's location is determined. The location will be determined with reference to global coordinate system utilized in conjunction with the virtual objects. At step 1204, scene map data is gathered in the manner similar to step 1102 above.

At steps 1206 and 1208, perspective-locked objects may be gathered from other parties. At 1206, objects from third-party contributors are retrieved. At 1208, object user shared information at 1208 may be gathered. Shared perspective-locked virtual objects at steps 1206 and 1208 may be provided from the central service 900, or directly from other user contributors. In some embodiments, information from third-party contributors may be transmitted directly to the device of the consuming user. In addition embodiments, user shared information at step 1208 may be provided by users are in contact with the consuming user. Users in contact with the consuming user may be individuals who are associated with the user's address book, direct contacts, or contact through a social media service who are identified as associated with the consuming user (e.g. "friends").

At 1209, a determination of position, the orientation and the FOV of a user's capture device is made.

In instances where markers are used such as those illustrated in FIGS. 3C and 4A, an initial determination is made as to whether or not user is proximate to one or more markers at 1210. The determination at 1210 is essentially whether markers at their associated real-world location in an environment would fall within the field of view of the consuming device. It should be understood that the use of markers is not required by the present technology. Thus step 1212 may be optional. Other systems of aligning a consuming user with the rendering locations and positions of shared virtual objects utilized. If markers are utilized and the markers are within the FOV of the consuming device for user, and the markers rendered in the display of the consuming device at 1212.

At step 1214, a determination is made as to whether or not object interaction has occurred. Object interaction at step 1214 may be as simple as positioning the user relative to the marker at a position, location, and orientation which is allowed to view the shared object. When the consuming user's device is at the position, location, and orientation, the object may be rendered. In other embodiments, the user may actively select a marker before placing the consuming device at the position, location, and orientation.

At 1216, the shared perspective-locked virtual object allowable consumption positions are determined. As noted above, some objects have only one position, orientation, and location at which a consumption may occur. Other objects have many allowable consumption positions, orientations, and locations.

At step 1220, the shared perspective-locked virtual object is rendered for a user when the user and consuming device are in the position, location, and orientation such that the user perspective relative to the object for proper consumption occurs. Consumption may be visualizing photos to that shown, listening to a particular recording sounds and a particular time, watching the video, reading text, playing with an interactive three-dimensional virtual object, and the like.

Figure 13:
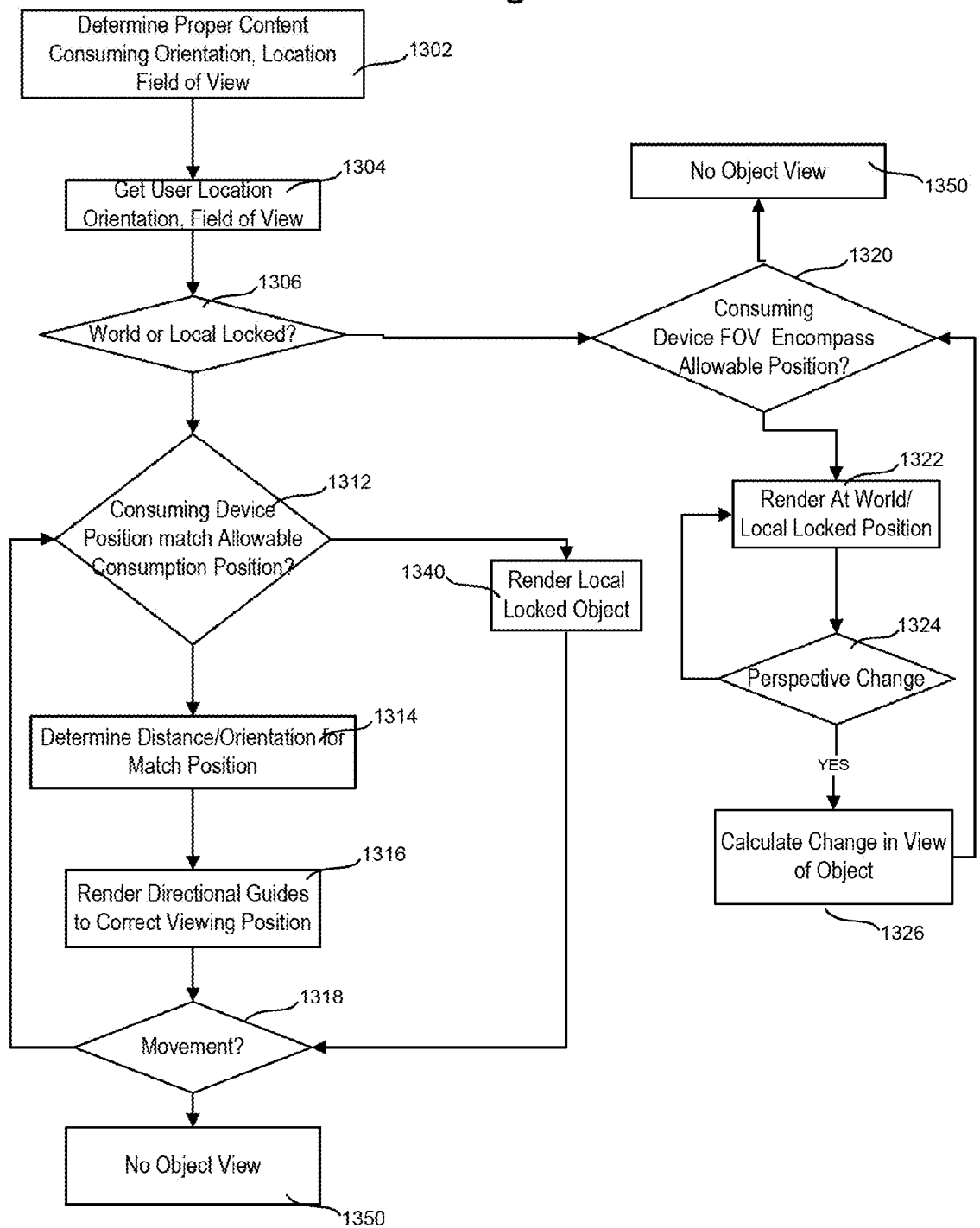
FIG. 13 is a flowchart illustrating step 1222 in FIG. 12.

Further details of one embodiment for performing step 1220 are illustrated in FIG. 13.

In some cases, user modification of a shared perspective-locked virtual object is permitted. At step 1224, a determination is made as to whether or not user modification of the object has occurred. User modification may include the user adding, annotating, or changing the object if the permissions on the shared object allow such modification. If user modification the object has occurred, then the data for the object is updated and displayed at 1226. Once content consumption has finished at 1228, method moves to the next object at 1230.

FIG. 13 illustrates one method for performing step 1220 in FIG. 12. At step 1302, a determination is made as to the proper content consuming orientation, location, position, and perspective for a particular object. The information retrieved at step 1302 defines the information available from one or more virtual objects at which allowable rendering positions occur. The consuming device location, orientation, position, and field of view are retrieved at 1304.

At 1306, an initial determination is made as to whether or not the shared perspective-locked virtual object to be rendered is world locked or local locked.

A world locked virtual object is one such that illustrated in FIG. 4B where the position of the object is locked to a location and orientation on a physical object. A local locked virtual object is one where the consumption position is locked to a particular perspective of the user.

If the shared perspective-locked virtual object is a local locked object, then at 1312, a determination is made as to whether or not the consuming device position, location, and orientation match and allowable consumption position. In this case, the allowable consumption position may be defined as a single allowable consumption position. If not, then a determination of changes to the location, position, and orientation which are needed to match the location, position, and orientation may be made at 1314, and directional guidance to correct the user's location, orientation, and position may be rendered at 1316. This allows the user to move into position for correct consumption of the virtual object. Directions may be provided in visual or audible form. At 1318 a determination is made as to whether or not user and consumption device have moved and if so, then the detection of the match between the actual device position and the allowable consumption position is made again 1312. When the user consuming device matches the allowable consumption position at 1312, the shared perspective-locked virtual object is rendered at 1340.

If the shared perspective-locked virtual object is a world locked object at 1306, then a determination is made at 1320 as to whether or not a consuming device is at one of a number of allowable positions, orientations, and locations. In one aspect, allowable consumption positions may be determined by determining the consumption devices' location, position, and orientation. In another aspect, for a world-locked object, allowable consumption positions may be determined by determining the consuming device's field of view relative to a real world object at which the virtual object should be defined.

If a match between the consuming device location, position, and orientation and an allowable position occurs, then at 1322 the object is rendered at the world locked position. At 1322, a determination of a user perspective change is made at 1324 and if the perspective of the user changes relative to the shared perspective-locked virtual object, the change is calculated at 1326 and the method returns to step 1320 to ensure that the consuming device is at an allowable location, position, and orientation with respect to the shared perspective-locked virtual object. If consuming devices is not at the correct position at 1320, and no object rendering occurs at 1350.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claim.

What is claimed is:

1. A method for rendering a shared virtual object in a see-through head mounted display, comprising:
    receiving object location data and consumption data for the shared virtual object, the object location data including at least an object geographic location respective to a global coordinate system, and the consumption data including a sole consumption position and a sole consumption orientation for consuming the shared virtual object with respect to a local coordinate system of a consumption device;
    displaying a virtual marker associated with the shared virtual object at a marker position corresponding to the object geographic location at least when the consumption device is distal from and pointed in a direction of the object geographic location, the marker position being the sole geographic location from which the shared virtual object may be viewed;
    determining a geographic location of the consumption device relative to the marker position;
    determining a consumption device position and a consumption device orientation in the local coordinate system; and
    outputting the shared virtual object on the consumption device in response to the consumption device position and the consumption device orientation respectively matching the sole consumption position and the sole consumption orientation, and in response to the geographic location of the consumption device matching the marker position.

2. The method of claim 1, wherein the consumption device outputs the shared virtual object at the object geographic location, the sole consumption position, and the sole consumption orientation such that the shared virtual object has a same perspective to the consumption device as to a capture device used to create the shared virtual object.

3. The method of claim 1, wherein determining the geographic location includes determining the positioning of the consumption device being proximate to the shared virtual object and that at least one position and orientation of the shared virtual object are within a field of view of the consumption device.

4. The method of claim 1, wherein the shared virtual object is one or more of a sound, visually displayed data, a picture, or a video.

5. The method of claim 1, wherein the consumption device is a first type of processing device and the shared virtual object was created by a second type of processing device.

6. An apparatus for creating a shared perspective-locked virtual object, comprising:
    a capture device;
    a processing device coupled to the capture device, the processing device programmed to perform a method comprising the steps of:
        determining a position of the capture device;
        determining a global coordinate location, position and orientation of the capture device;
        determining parameters enabling viewing of a shared perspective-locked virtual object, including creating shared virtual object rendering data, the data including rendering location data for the shared perspective-locked virtual object, the rendering location data including at least a global coordinate location, and at least one position and at least one orientation for the shared perspective-locked virtual object with respect to a local coordinate system within a field of view of a consumption device, the determining parameters comprising a viewing position from which the shared perspective-locked virtual object is viewable, the shared perspective-locked virtual object not viewable from locations other than the viewing position, and the determining parameters further including creating a virtual marker indicating the location of the viewing position, the virtual marker visible from a distance away from the virtual marker; and
        sharing the shared perspective-locked virtual object.

7. The apparatus of claim 6 wherein the apparatus further includes code programming the processing device to assign the virtual marker to the global coordinate location included in the rendering location data associated with the shared perspective-locked virtual object.

8. The apparatus of claim 6 wherein the apparatus further includes code programming the processing device to assign a world-locked status or a local-locked status to the shared perspective-locked virtual object.

9. The apparatus of claim 8 wherein the apparatus further includes code programming the processing device to assign the world locked status to the shared perspective-locked virtual object, and to determine a plurality of allowable global coordinate locations, allowable positions and allowable orientations for a consumption device to render the shared perspective-locked virtual object.

10. The apparatus of claim 8 wherein the apparatus further includes code programming the processing device to assign the local-locked status to the shared perspective-locked virtual object, and to determine one allowable global coordinate location, position and orientation for a consumption device to render the shared perspective-locked virtual object as a local locked object.

11. The apparatus of claim 6 wherein the capture device includes at least an audio sensor and a video camera, and wherein the apparatus further includes code programming the processing device to capture the shared perspective-locked virtual object rendering data using said audio sensor and video camera.

12. The apparatus of claim 6 further including a display, wherein the apparatus further includes code programming the processing device to receive rendering location data for a second shared perspective-locked virtual object created by another capture device, the rendering location data including at least one of each of an allowable location, allowable position, and allowable orientation;

determine a location, a position and an orientation of the apparatus;

if the location, position and orientation of the apparatus is proximate to the allowable location, allowable position, and allowable orientation, rendering the shared perspective-locked virtual object in the see through head mounted display.

13. A consumption device for rendering a shared virtual object, comprising:

a head mounted display;
  a processor coupled to the head mounted display and configured to:
    receive object location data and consumption data for a shared virtual object, the object location data including at least an object geographic location respective to a global coordinate system, and the consumption data including a sole consumption position and a sole consumption orientation for consuming the shared virtual object with respect to a local coordinate system of the consumption device;
    display a virtual marker associated with the shared virtual object at a marker position corresponding to the object geographic location at least when the consumption device is distal from and pointed in a direction of the object geographic location, the marker position being the sole geographic location from which the shared virtual object may be viewed;
    determine a geographic location of the consumption device relative to the marker position;
    determining a consumption device position and a consumption device orientation in the local coordinate system; and
    outputting the shared virtual object on the consumption device in response to the consumption device position and the consumption device orientation respectively matching the sole consumption position and the sole consumption orientation, and in response to the geographic location of the consumption device matching the marker position.

14. The apparatus of claim 13, wherein the processor is further configured to display the shared virtual object at the object geographic location, the sole consumption position, and the sole consumption orientation such that the object has a same perspective to the device as to a capture device used to create the shared virtual object.

15. The apparatus of claim 13, wherein the processor is further configured to determine the positioning of the consumption device being proximate to the shared virtual object and that at least one position and orientation of the shared virtual object are within a field of view of the consumption device.

16. The apparatus of claim 13, wherein the shared virtual object is one or more of a sound, visually displayed data, a picture, or a video.

17. The apparatus of claim 13, wherein the apparatus is a first type of processing device and the shared virtual object was created by a second type of processing device.

* * * * *